United States Patent
Ojima et al.

(10) Patent No.: US 11,765,242 B2
(45) Date of Patent: Sep. 19, 2023

(54) FILE EXCHANGE SYSTEM, COMMUNICATION SUPPORT DEVICE, FILE EXCHANGE SUPPORT DEVICE, FILE EXCHANGE METHOD, AND COMPUTER-READABLE NON-TRANSITORY STORAGE MEDIUM WITH PROGRAM STORED THEREIN

(71) Applicant: HONDA MOTOR CO., LTD., Tokyo (JP)

(72) Inventors: Satoru Ojima, Tokyo (JP); Katsunori Taguchi, Tokyo (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 17/976,998

(22) Filed: Oct. 31, 2022

(65) Prior Publication Data

US 2023/0144167 A1 May 11, 2023

(30) Foreign Application Priority Data

Nov. 5, 2021 (JP) .................. 2021-181278
Nov. 5, 2021 (JP) .................. 2021-181282

(51) Int. Cl.
*H04L 67/00* (2022.01)

(52) U.S. Cl.
CPC .................. *H04L 67/34* (2013.01)

(58) Field of Classification Search
None
See application file for complete search history.

(56) References Cited

U.S. PATENT DOCUMENTS

| 2012/0331088 A1* | 12/2012 | O'Hare ............... H04L 67/1097 709/214 |
| 2016/0291915 A1* | 10/2016 | Panchapakesan ..... G06F 3/1454 |
| 2018/0041567 A1* | 2/2018 | Kidambi ................. H04L 67/63 |

FOREIGN PATENT DOCUMENTS

| JP | H06-149711 A | 5/1994 |
| JP | 2000-215165 A | 8/2000 |
| JP | 2002-333986 A | 11/2002 |
| JP | 2006-134167 A | 5/2006 |

(Continued)

OTHER PUBLICATIONS

Konstantopoulos et al., "Distributed Personal Cloud Storage without Third Parties", Nov. 1, 2019, IEEE, IEEE Transactions on Parallel and Distributed Systems (vol. 30, Issue: 11, pp. 2434-2448) (Year: 2019).*

Primary Examiner — Davoud A Zand

(74) Attorney, Agent, or Firm — Carrier, Shende & Associates P.C.; Joseph P. Carrier; Fulchand P. Shende

(57) ABSTRACT

A file exchange system includes a communication support device equipped with a communication unit configured to communicate with a file exchange device. The communication support device further includes a processing unit which is configured to carry out processing in accordance with an instruction file that is written into a shared directory. The processing unit includes a file transmission processing unit which, in a case that the instruction file containing a file transmission instruction has been written into the shared directory, is configured to read out a transmission target file corresponding to the file transmission instruction from a storage unit, and to transmit a transmission file corresponding to the read out transmission target file to the file exchange device via the communication unit.

32 Claims, 10 Drawing Sheets

(56) References Cited

FOREIGN PATENT DOCUMENTS

| JP | 2008-234293 A | 10/2008 |
| JP | 2010-191706 A | 9/2010 |

* cited by examiner

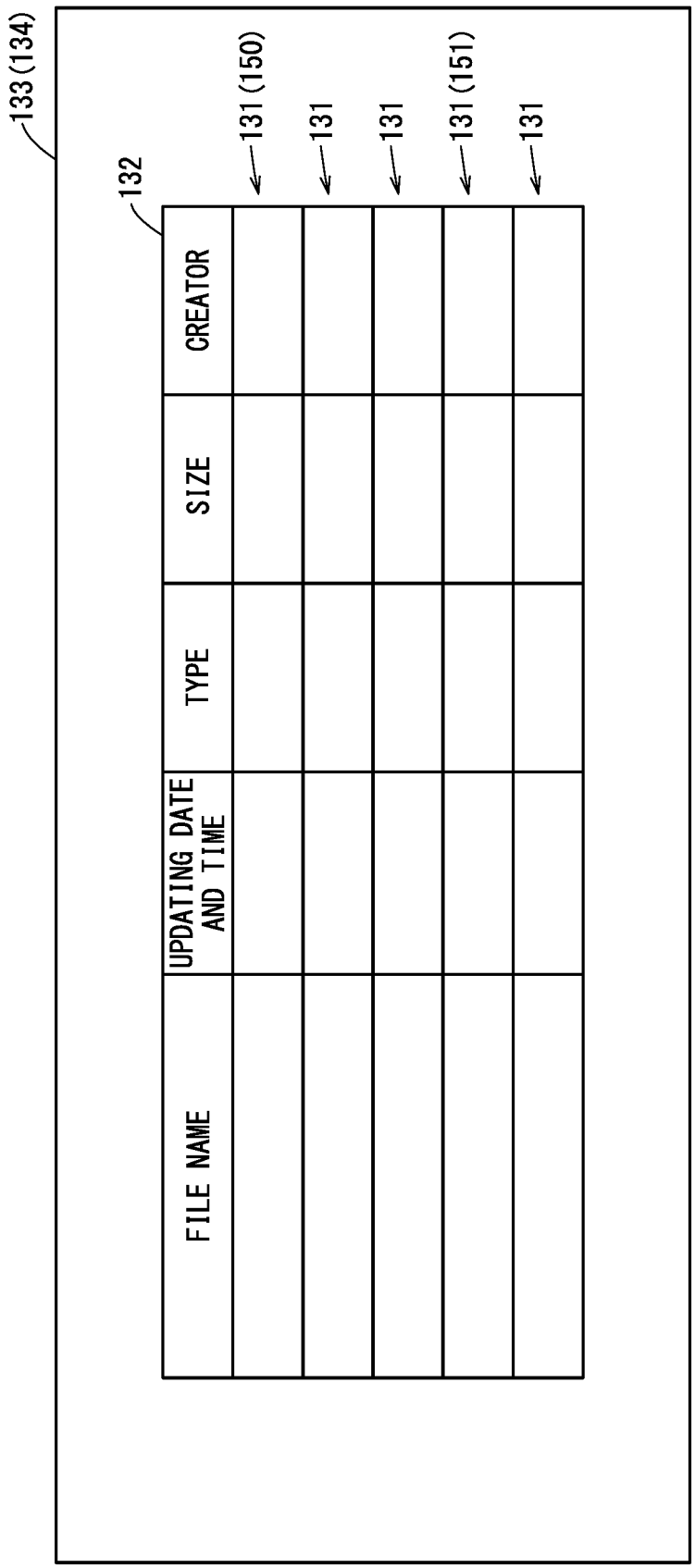

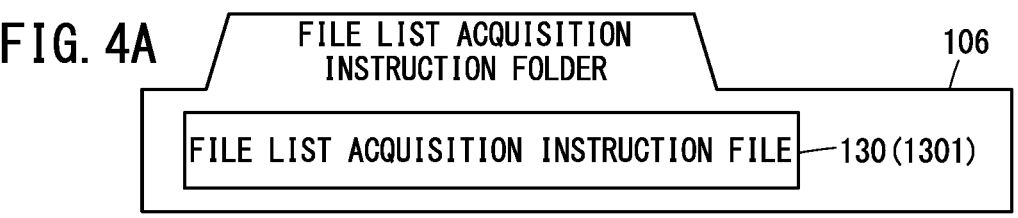
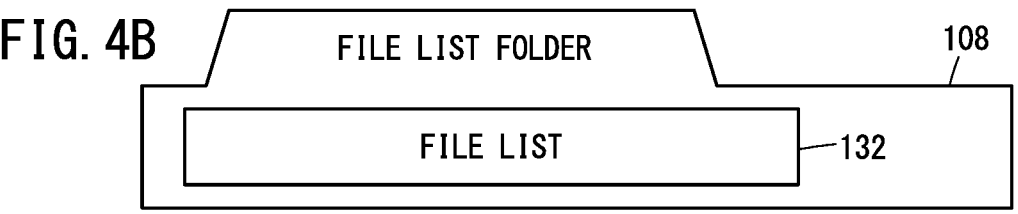
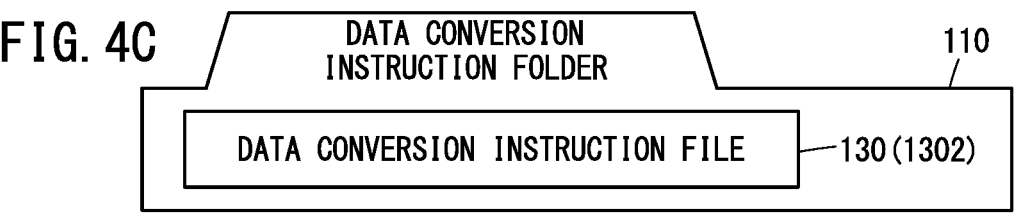
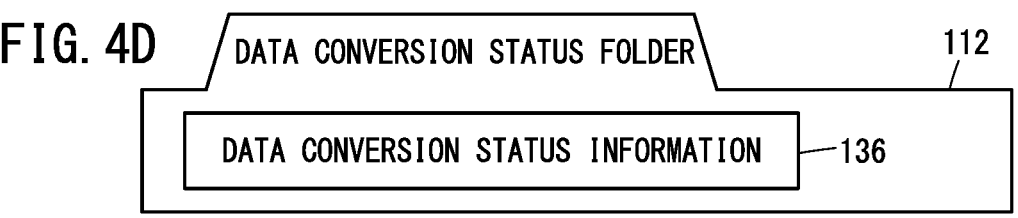
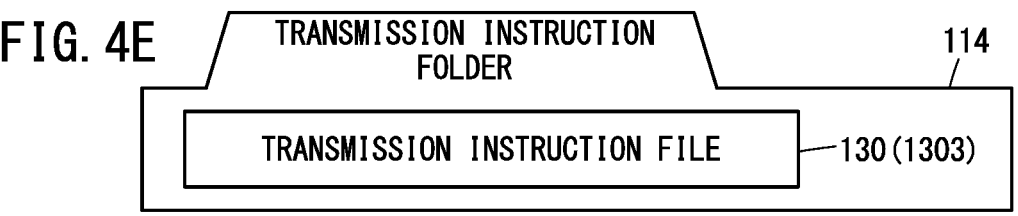
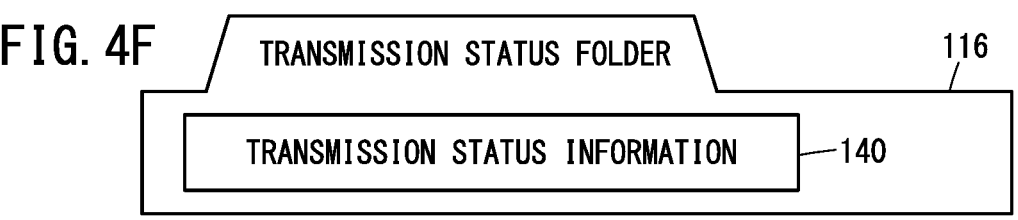

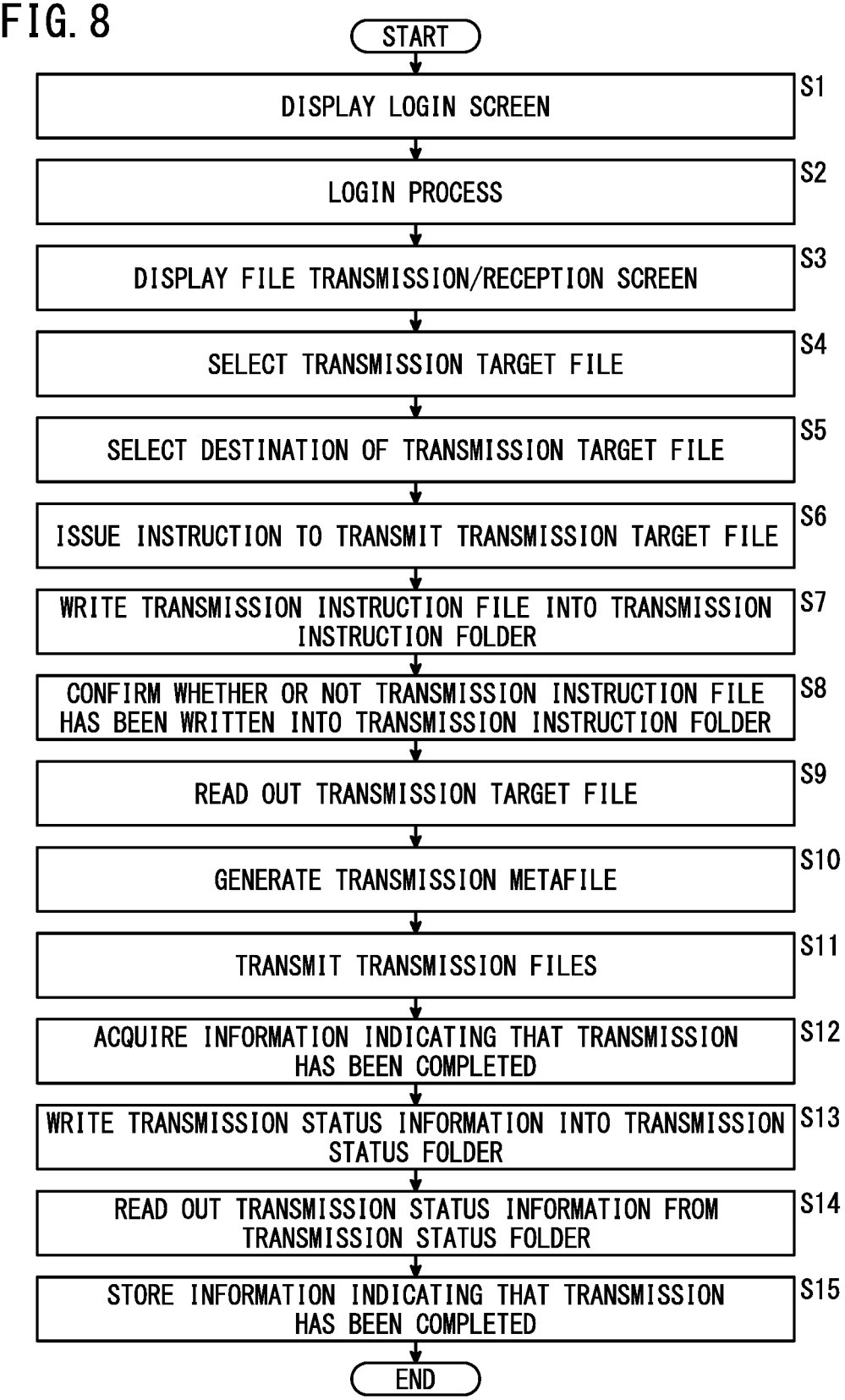

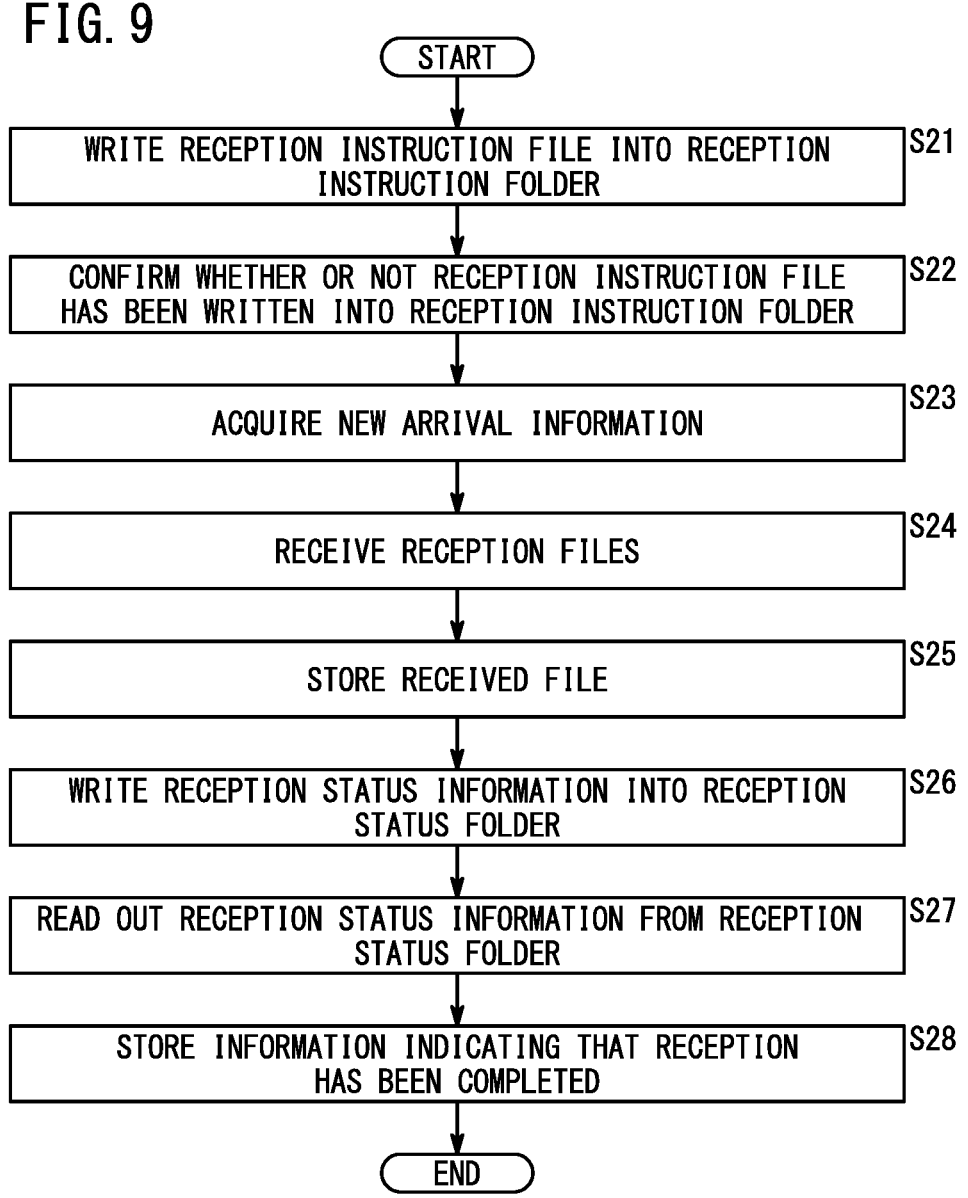

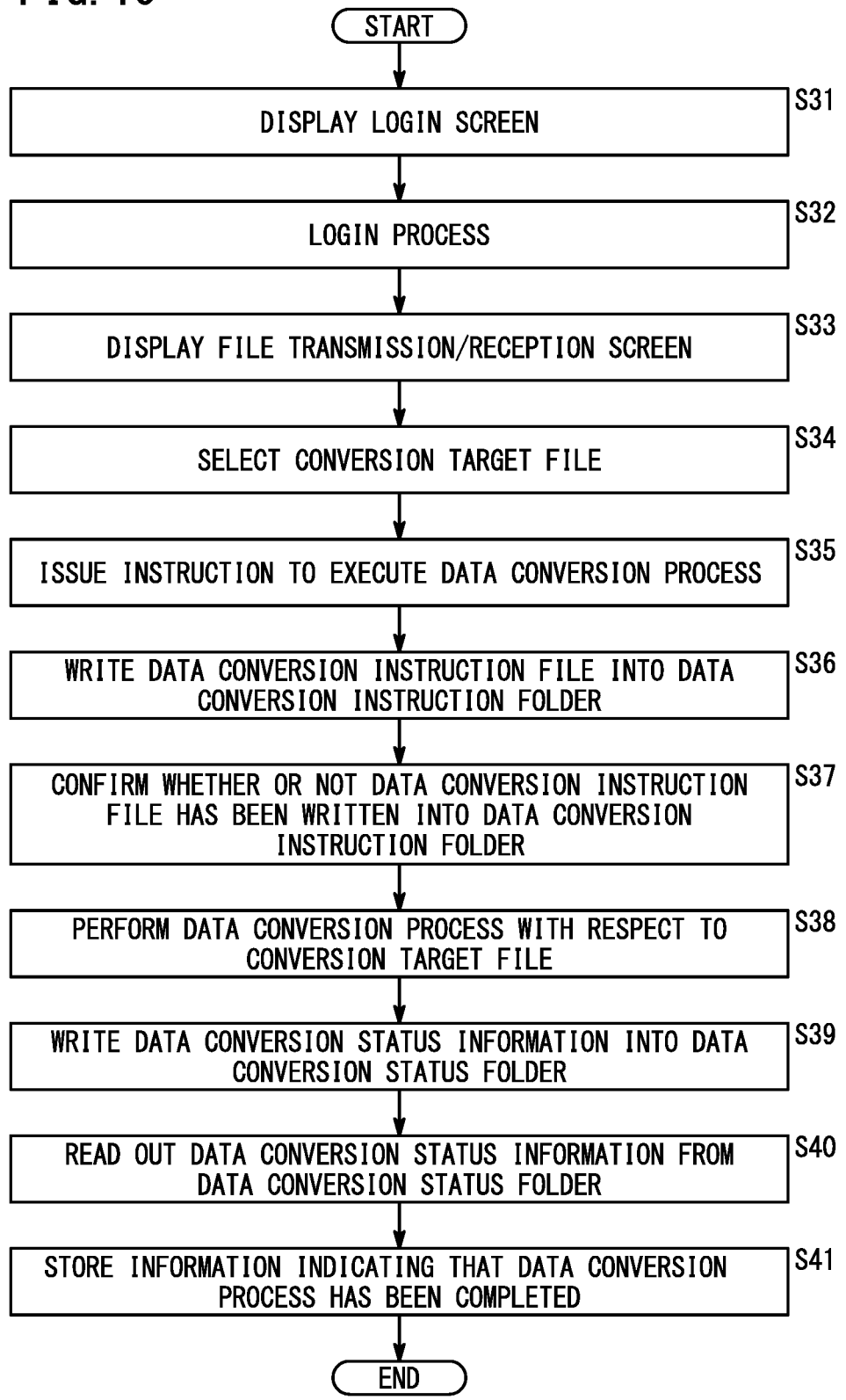

FILE EXCHANGE SYSTEM, COMMUNICATION SUPPORT DEVICE, FILE EXCHANGE SUPPORT DEVICE, FILE EXCHANGE METHOD, AND COMPUTER-READABLE NON-TRANSITORY STORAGE MEDIUM WITH PROGRAM STORED THEREIN

CROSS-REFERENCE TO RELATED APPLICATIONS

This application is based upon and claims the benefit of priority from Japanese Patent Applications No. 2021-181278 filed on Nov. 5, 2021 and No. 2021-181282 filed on Nov. 5, 2021, the contents of which are incorporated herein by reference.

BACKGROUND OF THE INVENTION

Field of the Invention

The present invention relates to a file exchange system, a communication support device, a file exchange support device, a file exchange method, and a computer-readable non-transitory storage medium having a program stored therein.

Description of the Related Art

In JP 2006-134167 A, a file transfer system is disclosed which is capable of transferring electronic data files via a file transfer server connected to a network.

SUMMARY OF THE INVENTION

However, in the file transfer system described in JP 2006-134167 A, in the case that the size of the data is relatively large, communication of the data requires a long time. Therefore, in the case that the size of the data is relatively large, the device that is used by the user when communication of the data is performed continuously carries out communications over a prolonged time period. Further, in the case that communications in order to receive instructions for exchange of the files are concentrated, a large processing load is imposed on the file exchange device, which leads to a delay in the processing of the file exchange.

The present invention has the object of solving the aforementioned problem.

A file exchange system according to one aspect of the present invention is a file exchange system configured to transmit and receive files in which product data is included between one user and another user using a file exchange device, the file exchange system including a communication support device equipped with a communication unit configured to communicate with the file exchange device on a basis of a predetermined communication protocol, wherein the communication support device further includes a processing unit which is configured to carry out processing in accordance with an instruction file that is written into a shared directory based on an instruction from the one user, and the processing unit includes a file transmission processing unit which, in a case that the instruction file containing a file transmission instruction has been written into the shared directory, is configured to read out a transmission target file corresponding to the file transmission instruction from a storage unit, and to transmit a transmission file corresponding to the read out transmission target file to the file exchange device via the communication unit.

A communication support device according to another aspect of the present invention is used in a file exchange system configured to transmit and receive files in which product data is included between one user and another user using a file exchange device, the communication support device including a communication unit configured to communicate with the file exchange device on a basis of a predetermined communication protocol, and a processing unit which is configured to carry out processing in accordance with an instruction file that is written into a shared directory based on an instruction from the one user, and the processing unit includes a file transmission processing unit which, in a case that the instruction file containing a file transmission instruction is written into the shared directory, is configured to read out a transmission target file corresponding to the file transmission instruction from a storage unit, and to transmit a transmission file corresponding to the read out transmission target file to the file exchange device via the communication unit.

A file exchange support device according to yet another aspect of the present invention is a file exchange support device used in a file exchange system in which files in which product data is included are transmitted and received between one user and another user using a file exchange device, the file exchange support device including a supply unit configured to supply an instruction screen used when an instruction is carried out by the one user, and an instruction unit configured to write an instruction file into a shared directory in accordance with the instruction carried out on the instruction screen, wherein the file exchange system includes a communication support device equipped with a communication unit configured to communicate with the file exchange device on a basis of a predetermined communication protocol, the communication support device further includes a processing unit configured to carry out processing in accordance with the instruction file that is written into the shared directory, the instruction unit includes a file transmission instruction unit which, in a case that the instruction carried out on the instruction screen is a file transmission instruction, is configured to write the instruction file in which the file transmission instruction is included into the shared directory, and the instruction unit includes a file transmission processing unit which, in a case that the instruction file in which the file transmission instruction is included has been written into the shared directory, is configured to read out a transmission target file corresponding to the file transmission instruction from a storage unit, and to transmit a transmission file corresponding to the read out transmission target file to the file exchange device via the communication unit.

A file exchange method according to still another aspect of the present invention is a file exchange method for transmitting and receiving files in which product data is included between one user and another user using a file exchange device, the file exchange method including a step of writing an instruction file into a shared directory, and a step of carrying out processing in accordance with the instruction file, in a case that the instruction file has been written into the shared directory, wherein in a case that the instruction file in which a file transmission instruction is included has been written into the shared directory, then in the step of carrying out processing in accordance with the instruction file, a transmission target file in accordance with the file transmission instruction is read out from a storage unit, and a transmission file corresponding to the read out transmission target file is transmitted to the file exchange device via a communication unit configured to carry out communications with the file exchange device on a basis of a predetermined communication protocol.

A computer-readable non-transitory storage medium according to yet another aspect of the present invention has a program stored therein, in order to cause the computer to execute a process including a step of confirming whether or not an instruction file has been written into a shared directory, and a step of carrying out processing in accordance with the instruction file, in a case that the instruction file has been written into the shared directory, wherein, in a case that the instruction file in which a file transmission instruction is included has been written into the shared directory, then in the step of carrying out processing in accordance with the instruction file, the transmission target file in accordance with the file transmission instruction is read out from a storage unit, and the transmission file corresponding to the read out transmission target file is transmitted to a file exchange device via a communication unit that carries out communications with the file exchange device on a basis of a predetermined communication protocol.

According to the present invention, it is possible to provide a file exchange system, a communication support device, a file exchange support device, a file exchange method, and a computer-readable non-transitory storage medium having a program stored therein, which are capable of satisfactorily carrying out the exchange of files.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 3 is a diagram showing an example of an instruction screen;

FIG. 4A is a diagram showing an example of a file list acquisition instruction file;

FIG. 4B is a diagram showing an example of a file list;

FIG. 4C is a diagram showing an example of a data conversion instruction file;

FIG. 4D is a diagram showing an example of data conversion process status information;

FIG. 4E is a diagram showing an example of a transmission instruction file;

FIG. 4F is a diagram showing an example of transmission status information;

FIG. 8 is a flow chart illustrating an example of operations of the file exchange system according to the one embodiment;

FIG. 9 is a flow chart illustrating an example of operations of the file exchange system according to the one embodiment; and FIG. 10 is a flow chart illustrating an example of operations of the file exchange system according to the one embodiment.

DESCRIPTION OF THE INVENTION

Embodiment

Figure 1:
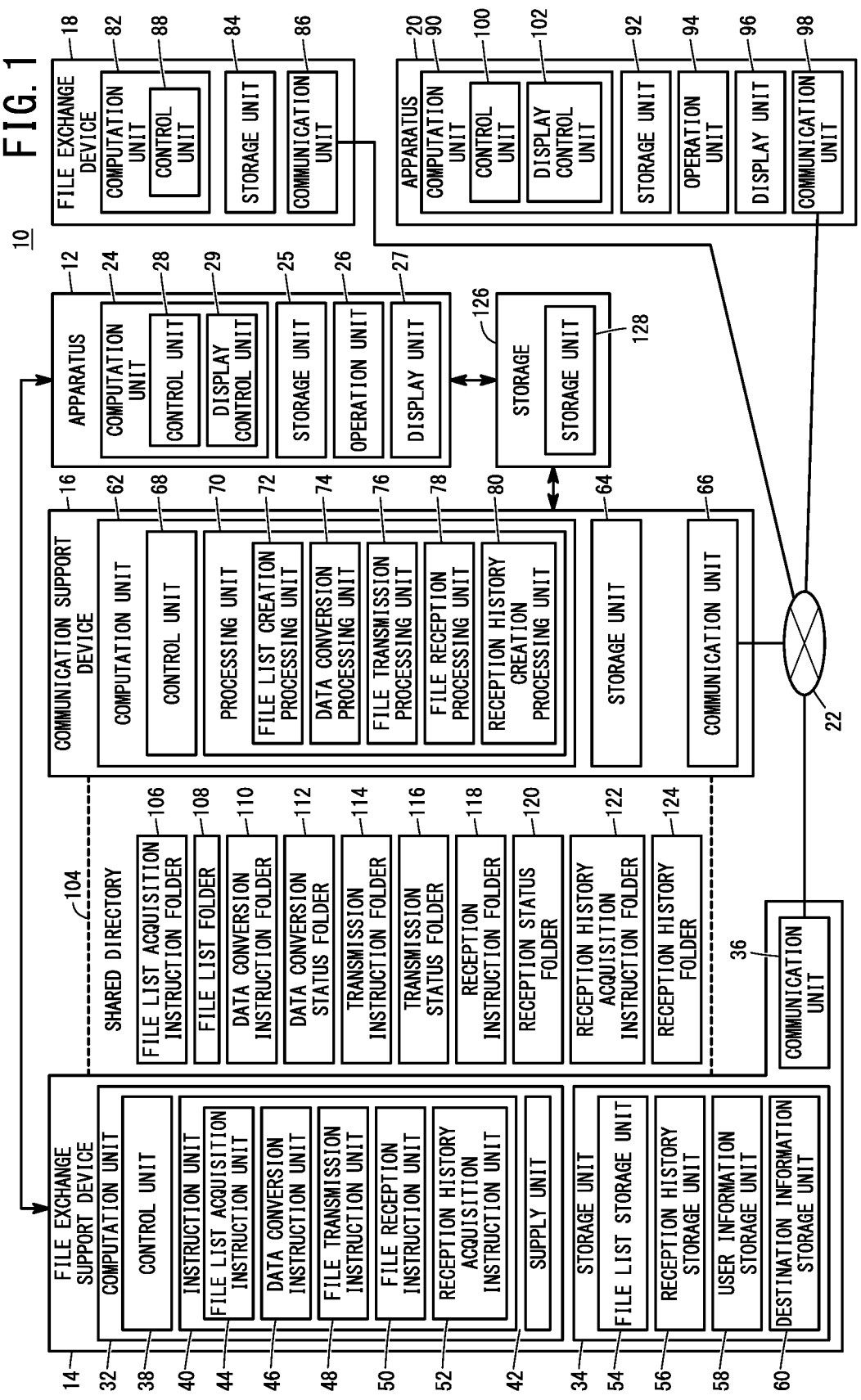
FIG. 1 is a block diagram showing a file exchange system according to one embodiment of the present invention.

A description will be given with reference to FIGS. 1 to 10 concerning a file exchange system, a communication support device, a file exchange support device, a file exchange method, and a computer-readable non-transitory storage medium having a program stored therein according to one embodiment of the present invention. FIG. 1 is a block diagram showing a file exchange system according to an embodiment of the present invention.

A file exchange system 10 according to the present embodiment carries out transmission and reception of files between one user and another user using a file exchange device 18.

The file exchange system 10 can be constituted by an apparatus 12, a file exchange support device 14, a communication support device 16, the file exchange device 18, an apparatus 20, and a storage 126. One file exchange support device 14 may be provided with respect to one file exchange device 18. Further, a plurality of communication support devices 16 may be provided with respect to one file exchange support device 14. Further, a plurality of the file exchange support devices 14 may be provided with respect to one file exchange device 18. Also, a plurality of the apparatuses 12 may be provided with respect to one communication support device 16. In the example shown in FIG. 1, in order to simplify the description, one apparatus 12, one file exchange support device 14, one communication support device 16, one file exchange device 18, and one apparatus 20 are shown.

The apparatus 12 is provided, for example, in a certain office of a certain company. The user of the apparatus 12, for example, is an employee or the like who works at the office where the apparatus 12 is provided.

The apparatus 20 is provided, for example, at a client (business partner) of the company in which the apparatus 12 is provided. The user of the apparatus 20, for example, is an employee or the like who works for the business partner.

Exchange of files in which the file exchange device 18 is used can be performed between the user operating the apparatus 12 and the user operating the apparatus 20. More specifically, using the file exchange device 18 and a file exchange device 183 (refer to FIG. 2), files can be exchanged between the user operating the apparatus 12 and the user operating the apparatus 20.

A first office from among a plurality of offices belonging to a certain company may be equipped with the apparatus 12, and a second office from among a plurality of offices may be equipped with the apparatus 20.

The apparatus 12 may be located in a first country, and the apparatus 20 may be located in a second country that differs from the first country.

Figure 2:
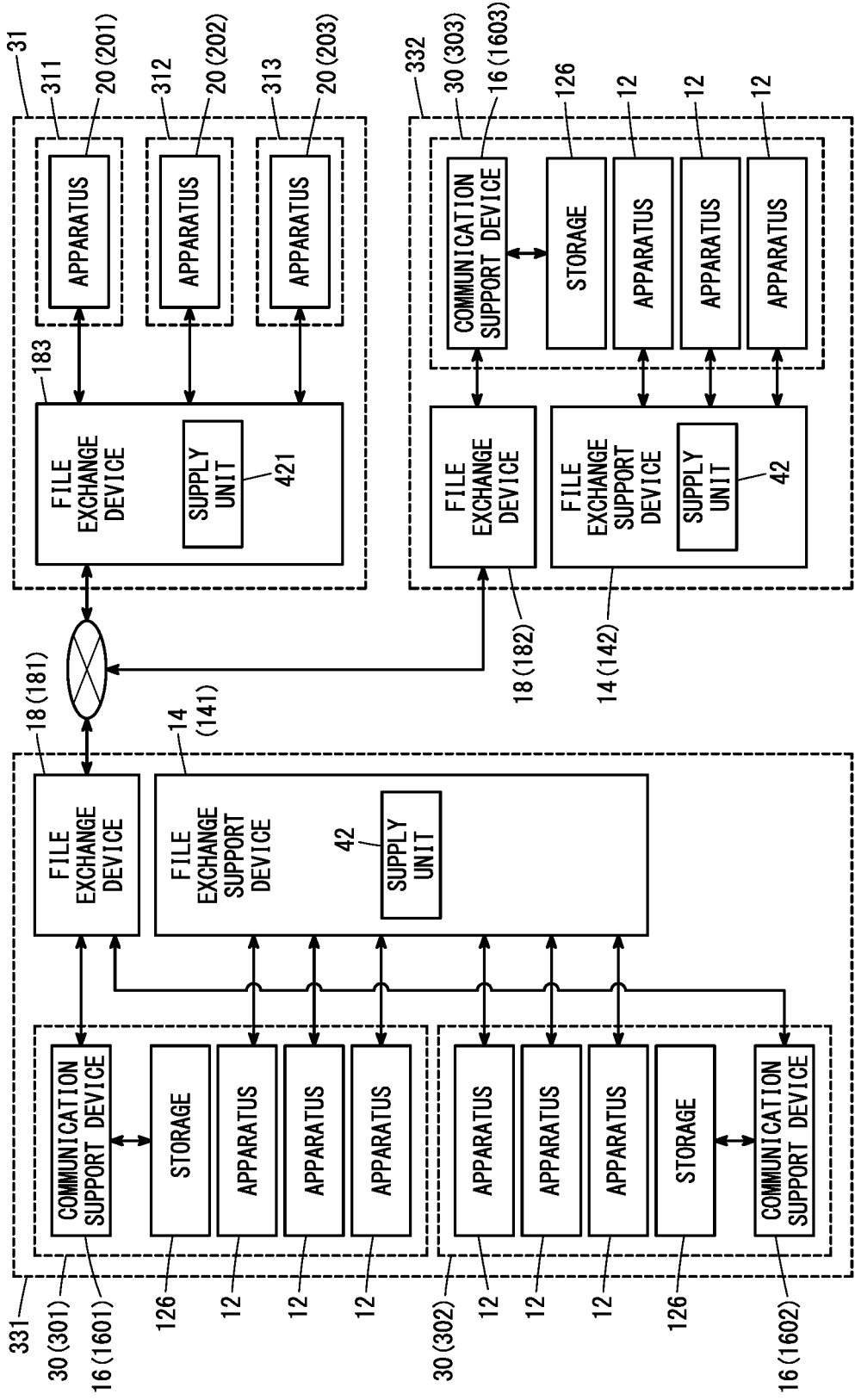
FIG. 2 is a block diagram illustrating an example of the file exchange system according to the one embodiment.

FIG. 2 is a block diagram illustrating an example of the configuration of the file exchange system according to the one embodiment. In the example shown in FIG. 2, illustration of a shared directory 104, which will be described later, is omitted.

A plurality of offices 30 belong to the company. A first office 301 from among the plurality of offices 30, and a second office 302 from among the plurality of offices 30 are located within a first area 331. The first area 331, for example, is a country in which a head office of a certain company is located. Although a plurality of offices 30 may be located within the first area 331, only two of such offices 30 are shown in FIG. 2.

The file exchange device 18 is provided within the first area 331. More specifically, a file exchange device 181 is provided within the first area 331. Further, the file exchange support device 14 is provided within the first area 331. More specifically, a file exchange support device 141 is provided within the first area 331. Further, a plurality of communication support devices 16 are provided within the first area 331. More specifically, a first communication support device 1601, and a second communication support device 1602 are provided within the first area 331. In the example shown in FIG. 2, one file exchange support device 14 is provided with respect to one file exchange device 18. Further, in the example shown in FIG. 2, a plurality of communication support devices 16 are provided with respect to one file exchange support device 14. Moreover, a plurality of the file exchange devices 18 may be provided within the first area 331. Further, a plurality of the file exchange support devices 14 may be provided with respect to one file exchange device 18.

The first communication support device 1601 from among the plurality of communication support devices 16 is provided in the first office 301. The first office 301 is equipped with a plurality of the apparatuses 12. These apparatuses 12 can be provided in each of a plurality of departments belonging to the first office 301.

The second communication support device 1602 from among the plurality of communication support devices 16 is provided in the second office 302. The second office 302 is equipped with a plurality of the apparatuses 12. These apparatuses 12 can be provided in each of a plurality of departments belonging to the second office 302.

The offices 30 are located in a second area 332 that differs from the first area 331. More specifically, an office 303 is located in the second area 332. Moreover, although a plurality of offices 30 may be located within the second area 332, only one of such offices 30 is shown in FIG. 2.

The file exchange device 18 is provided in the second area 332. More specifically, a file exchange device 182 is provided in the second area 332. Further, the file exchange support device 14 is provided in the second area 332. More specifically, a file exchange support device 142 is provided in the second area 332. Further, a communication support device 16 is provided within the second area 332. More specifically, a communication support device 1603 is provided within the second area 332.

The communication support device 1603 is provided in the office 303. The office 303 is equipped with a plurality of the apparatuses 12. These apparatuses 12 can be provided in each of a plurality of departments belonging to the office 303.

A client (business partner) 31 may be provided with the file exchange device 183. The file exchange device 183 differs from the file exchange device 18 in that a supply unit 421 is provided therein. More specifically, the file exchange device 183 differs from the file exchange devices 181 and 182 in that the supply unit 421 is provided therein. The supply unit 421, for example, is an HTTP server. The supply unit 421 supplies a non-illustrated instruction screen which is used when the user who operates the apparatus 20 issues an instruction. More specifically, the supply unit 421 supplies information (signals) to the apparatus 20 in order to display an instruction screen on a non-illustrated display unit that is provided in the apparatus 20. The supply unit 421 is not provided in the file exchange device 18. More specifically, the supply unit 421 is not provided in the file exchange devices 181 and 182. As will be discussed later, a supply unit 42 (refer to FIG. 1) corresponding to the supply unit 421 is provided in the file exchange support device 14.

A first apparatus 201 from among a plurality of the apparatuses 20 is provided at a first client 311. A second apparatus 202 from among a plurality of the apparatuses 20 is provided at a second client 312. A third apparatus 203 from among a plurality of the apparatuses 20 is provided at a third client 313. The first client 311 is located, for example, in a first country. The second client 312 is located, for example, in a second country. The third client 313 is located, for example, in a third country.

The file exchange system 10 according to the present embodiment can be configured in the manner shown in FIG. 2, although the present invention is not limited to this feature.

As shown in FIG. 1, the apparatus 12 may be equipped with a computation unit 24, a storage unit 25, an operation unit 26, and a display unit 27. It should be noted that although the apparatus 12 may comprise constituent elements other than these constituent elements, descriptions of such other elements are omitted herein. For example, at least a portion of the apparatus 12 may be constituted by a server or the like, which is provided externally of the office in which the apparatus 12 is provided.

The computation unit 24 may be constituted by a processor such as a CPU (Central Processing Unit), a GPU (Graphics Processing Unit), or the like, and more specifically, by processing circuitry.

The computation unit 24 may be equipped with a control unit 28 and a display control unit 29. The control unit 28 and the display control unit 29 can be realized by programs stored in the storage unit 25 being executed by the computation unit 24. The control unit 28 administers the control of the apparatus 12 as a whole. The display control unit 29 is capable of controlling a screen display of the display unit 27. Moreover, it should be noted that although the computation unit 24 may comprise constituent elements other than these constituent elements, descriptions of such other elements are omitted herein.

Moreover, it should be noted that at least a portion of the control unit 28 and the display control unit 29 may be implemented by an integrated circuit such as an ASIC (Application Specific Integrated Circuit) or a FPGA (Field-Programmable Gate Array). Further, at least a portion of the control unit 28 and the display control unit 29 may be constituted by an electronic circuit including a discrete device.

The storage unit 25 may comprise a non-illustrated volatile memory and a non-illustrated non-volatile memory. As the volatile memory, there may be cited, for example, a RAM (Random Access Memory). The volatile memory is used as a working memory of a processor, and temporarily stores data or the like required for processing or calculations. As the non-volatile memory, there may be cited, for example, a ROM (Read Only Memory), a flash memory, or the like. The non-volatile memory is used as a storage memory, and stores therein programs, tables, maps, and the like. At least a portion of the storage unit 25 may be provided in the processor, the integrated circuit, or the like, which were described above. Further, the storage unit 25 may further be equipped with an HDD (Hard Disk Drive), an SSD (Solid State Drive), or the like. Various applications (application programs) can be installed in the storage unit 25. For example, a CAD (Computer-Aided Design) application or the like can be installed in the storage unit 25.

The operation unit 26 can be used when the user performs an operation input with respect to the apparatus 12. As the operation unit 26, there may be cited a keyboard, a mouse, or the like, although the present invention is not limited to this feature. A non-illustrated display element may be provided in the display unit 27. As such a display element, there may be used, for example, a liquid crystal display element, an organic electroluminescence display element, or the like. The operation unit 26 and the display unit 27 may be constituted by a non-illustrated touch panel that is equipped with such a display element.

The apparatus 12 is capable of communicating with the file exchange support device 14 via a non-illustrated network.

A storage unit 128 may be provided in the storage 126. A plurality of files can be stored in the storage unit 128. Product data (product information) may be included, respectively, in each of the plurality of files. The product data may be generated, for example, by a user who operates the apparatus 12, although the present invention is not limited to this feature. The product data, for example, is CAD data, CAE (Computer-Aided Engineering) data, moving image data, TIFF (Tagged Image File Format) data, CG (Computer Graphics) data, certification data, or ECU (Electronic Control Unit) data, although the present invention is not limited to this feature. As the CAD data, there may be cited, for example, two-dimensional CAD data and three-dimensional CAD data. The storage 126 can be accessed from both the apparatus 12 and the communication support device 16. The description provided herein is based on an exemplary case in which the storage 126 is provided separately from the apparatus 12, however, the storage 126 may be provided within the apparatus 12. Further, the storage 126 may also be provided within the communication support device 16.

The file exchange support device 14 may be equipped with a computation unit 32, a storage unit 34, and a communication unit 36. Moreover, it should be noted that although the file exchange support device 14 may comprise constituent elements other than these constituent elements, descriptions of such other elements are omitted herein.

The computation unit 32 may be constituted by a processor such as a CPU, a GPU, or the like, and more specifically, by processing circuitry.

The storage unit 34 may comprise a non-illustrated volatile memory and a non-illustrated non-volatile memory. Further, the storage unit 34 may further be equipped with an HDD, an SSD, or the like. The storage unit 34 may be equipped with a file list storage unit 54 and a reception history storage unit 56. The storage unit 34 may further be equipped with a user information storage unit 58, i.e., a user database. The storage unit 34 may further be equipped with a destination information storage unit 60, i.e., a destination database.

The communication unit 36 is equipped with, for example, a non-illustrated communication module. The communication unit 36 can carry out transmission and reception of data to and from a later-described communication unit 86 or the like, for example, via a network 22 such as the Internet or the like.

The computation unit 32 may be equipped with a control unit 38, an instruction unit 40, and a supply unit 42. The control unit 38, the instruction unit 40, and the supply unit 42 can be realized by programs stored in the storage unit 34 being executed by the computation unit 32. Moreover, it should be noted that although the computation unit 32 may comprise constituent elements other than these constituent elements, descriptions of such other elements are omitted herein. Moreover, at least a portion of the control unit 38, the instruction unit 40, and the supply unit 42 may be realized by an integrated circuit such as an ASIC, an FPGA, or the like. Further, at least a portion of the control unit 38, the instruction unit 40, and the supply unit 42 may be constituted by an electronic circuit including a discrete device.

The instruction unit 40 may be equipped with a file list acquisition instruction unit 44, a data conversion instruction unit 46, a file transmission instruction unit 48, a file reception instruction unit 50, and a reception history acquisition instruction unit 52. The file list acquisition instruction unit 44, the data conversion instruction unit 46, the file transmission instruction unit 48, the file reception instruction unit 50, and the reception history acquisition instruction unit 52 can be realized by programs stored in the storage unit 34 being executed by the computation unit 32.

The communication support device 16 may be equipped with a computation unit 62, a storage unit 64, and a communication unit 66. Moreover, it should be noted that although the communication support device 16 may comprise constituent elements other than these constituent elements, descriptions of such other elements are omitted herein.

The computation unit 62 may be constituted by a processor such as a CPU, a GPU, or the like, and more specifically, by processing circuitry.

The storage unit 64 may comprise a non-illustrated volatile memory and a non-illustrated non-volatile memory. Further, the storage unit 64 may further be equipped with an HDD, an SSD, or the like.

The communication unit 66 is equipped with, for example, a non-illustrated communication module. The communication unit 66 can carry out transmission and reception of data to and from the communication unit 86 or the like, for example, via the network 22 such as the Internet or the like.

The computation unit 62 may be equipped with a control unit 68 and a processing unit 70. The control unit 68 and the processing unit 70 can be realized by programs stored in the storage unit 64 being executed by the computation unit 62. Moreover, it should be noted that although the computation unit 62 may comprise constituent elements other than these constituent elements, descriptions of such other elements are omitted herein. Moreover, at least a portion of the control unit 68 and the processing unit 70 may be realized by an integrated circuit such as an ASIC, an FPGA, or the like. Further, at least a portion of the control unit 68 and the processing unit 70 may be constituted by an electronic circuit including a discrete device.

The processing unit 70 may be equipped with a file list creation processing unit 72, a data conversion processing unit 74, a file transmission processing unit 76, a file reception processing unit 78, and a reception history creation processing unit 80. The file list creation processing unit 72, the data conversion processing unit 74, the file transmission processing unit 76, the file reception processing unit 78, and the reception history creation processing unit 80 can be realized by programs stored in the storage unit 64 being executed by the computation unit 62.

The file exchange device 18 may be equipped with a computation unit 82, a storage unit 84, and the communication unit 86. It should be noted that although the file exchange device 18 may comprise constituent elements other than these constituent elements, descriptions of such other elements are omitted herein.

The computation unit 82 may be constituted by a processor such as a CPU, a GPU, or the like, and more specifically, by processing circuitry.

The storage unit 84 may comprise a non-illustrated volatile memory and a non-illustrated non-volatile memory. Further, the storage unit 84 may further be equipped with an HDD, an SSD, or the like.

The communication unit 86 is equipped with, for example, a non-illustrated communication module. The communication unit 86 can carry out transmission and reception of data to and from the communication units 36 and 66, for example, via the network 22 such as the Internet or the like. The communication unit 86 can carry out transmission and reception of data to and from a later-described communication unit 98, for example, via the network 22 such as the Internet or the like.

The computation unit 82 may be equipped with a control unit 88. The control unit 88 can be realized by programs stored in the storage unit 84 being executed by the computation unit 82. Moreover, it should be noted that although the computation unit 82 may comprise constituent elements other than these constituent elements, descriptions of such other elements are omitted herein. Moreover, at least a portion of the control unit 88 may be realized by an integrated circuit such as an ASIC, an FPGA, or the like. Further, at least a portion of the control unit 88 may be constituted by an electronic circuit including a discrete device.

The apparatus 20 may be equipped with a computation unit 90, a storage unit 92, an operation unit 94, a display unit 96, and the communication unit 98. It should be noted that although the apparatus 20 may comprise constituent elements other than these constituent elements, descriptions of such other elements are omitted herein.

The computation unit 90 may be constituted by a processor such as a CPU, a GPU, or the like, and more specifically, by processing circuitry. The computation unit 90 may be equipped with a control unit 100 and a display control unit 102. The control unit 100 and the display control unit 102 can be realized by programs stored in the storage unit 92 being executed by the computation unit 90. Moreover, it should be noted that although the computation unit 90 may comprise constituent elements other than these constituent elements, descriptions of such other elements are omitted herein. The control unit 100 administers the control of the apparatus 20 as a whole. The display control unit 102 is capable of controlling a screen display of the display unit 96. Moreover, at least a portion of the control unit 100 and the display control unit 102 may be realized by an integrated circuit such as an ASIC, an FPGA, or the like. Further, at least a portion of the control unit 100 and the display control unit 102 may be constituted by an electronic circuit including a discrete device.

The storage unit 92 may comprise a non-illustrated volatile memory and a non-illustrated non-volatile memory. Further, the storage unit 92 may further be equipped with an HDD, an SSD, or the like.

The operation unit 94 can be used when the user performs an operation input with respect to the apparatus 20. As the operation unit 94, there may be cited a keyboard, a mouse, or the like, although the present invention is not limited to this feature. A non-illustrated display element may be provided in the display unit 96.

The communication unit 98 is equipped with, for example, a non-illustrated communication module. The communication unit 98 can carry out transmission and reception of data to and from the communication unit 86 or the like via the network 22 such as the Internet or the like.

The shared directory 104 can be set, for example, in a non-illustrated storage unit (storage) provided in a non-illustrated NFS (Network File System) server. In accordance with such an NFS, a storage area corresponding to the shared directory 104 is mounted in a local storage constituted by the storage unit 34. Further, in accordance with such an NFS, a storage area corresponding to the shared directory 104 is mounted in a local storage constituted by the storage unit 64. The file exchange support device 14 and the communication support device 16 are each capable of accessing the shared directory 104. Moreover, the shared directory 104 may be set in a non-illustrated storage unit (storage) provided in a non-illustrated SMB (Server Message Block) server. In the case that the file exchange support device 14 is constituted by a Windows (registered trademark) server and the communication support device 16 is also constituted by a Windows (registered trademark) server, a more satisfactory system can be built by using SMB than using NFS.

A file list acquisition instruction folder 106, a file list folder 108, a data conversion instruction folder 110, and a data conversion status folder 112 can be provided in the shared directory 104. A transmission instruction folder 114, a transmission status folder 116, a reception instruction folder 118, a reception status folder 120, a reception history acquisition instruction folder 122, and a reception history folder 124 can further be provided in the shared directory 104.

As noted previously, the file exchange support device 14 may be equipped with the control unit 38. The control unit 38 administers the control of the file exchange support device 14 as a whole.

As noted previously, the file exchange support device 14 may be equipped with the supply unit 42. The supply unit 42, for example, is an HTTP server. The supply unit 42 supplies an instruction screen 133 (refer to FIG. 3) which is used when the user who operates the apparatus 12 issues an instruction. More specifically, the supply unit 42 supplies an operation screen which is used when an operation is carried out by the user who operates the apparatus 12. More specifically, the supply unit 42 supplies information (signals) to the apparatus 12 in order to display the instruction screen 133 on the display unit 27 that is provided in the apparatus 12. In a state in which communication is established between the apparatus 12 and the file exchange support device 14, the instruction screen 133 is displayed on the display unit 27 that is provided in the apparatus 12. As the instruction screen 133, there may be cited a later-described file transmission/reception screen 134 or the like, although the present invention is not limited to this feature.

FIG. 3 is a diagram showing an example of an instruction screen. A state in which a file list 132 is displayed on the instruction screen 133 is shown in FIG. 3. The file list 132 is a list of a plurality of files 131 that are stored in the storage unit 128. Although information other than the file list 132 can be displayed on the instruction screen 133, in FIG. 3, such information other than the file list 132 is omitted.

As noted previously, the file exchange support device 14 may be equipped with the instruction unit 40. The instruction unit 40 writes instruction files 130 into the shared directory 104 in accordance with instructions issued by the user who operates the apparatus 12. The instructions issued by the user who operates the apparatus 12 can be carried out, for example, on the instruction screen 133 in the manner described above. The reference numeral 130 is used when describing the instruction files without distinguishing them in particular, and the reference numerals 1301 to 1305 are used when descriptions are made concerning the individual instruction files.

As noted previously, the instruction unit 40 may be equipped with the file list acquisition instruction unit 44. In the case that an instruction to acquire the file list 132 is performed by the user on the instruction screen 133, the file list acquisition instruction unit 44 issues the instruction to acquire the file list 132. The file list acquisition instruction unit 44 writes a file list acquisition instruction file 1301, which is an instruction file 130 in which the instruction to acquire the file list 132 is included, into the shared directory 104. More specifically, the file list acquisition instruction unit 44 writes the file list acquisition instruction file 1301 into the file list acquisition instruction folder 106 that is provided in the shared directory 104. FIG. 4A is a diagram showing an example of the file list acquisition instruction file. In FIG. 4A, a state is shown conceptually in which the file list acquisition instruction file 1301 is written into the file list acquisition instruction folder 106.

As noted previously, the instruction unit 40 may be equipped with the data conversion instruction unit 46. The data conversion instruction unit 46 can issue a data conversion instruction, which is an instruction to convert data. In the case that the data conversion instruction is issued by the user on the instruction screen 133, the data conversion instruction unit 46 carries out the instruction to convert the data. Selection of a conversion target file 151 which serves as an object to be converted can be carried out by the user on the file transmission/reception screen 134 that is displayed on the display unit 27 of the apparatus 12. The conversion target file 151 can be selected from among the plurality of files 131 that are stored in the storage unit 128. The data conversion instruction unit 46 writes a data conversion instruction file 1302, which is an instruction file 130 in which the data conversion instruction is included, into the shared directory 104. More specifically, the data conversion instruction unit 46 writes the data conversion instruction file 1302 into the data conversion instruction folder 110 that is provided in the shared directory 104. FIG. 4C is a diagram showing an example of a data conversion instruction file. In FIG. 4C, a state is shown conceptually in which the data conversion instruction file 1302 is written into the data conversion instruction folder 110.

As noted previously, the instruction unit 40 may be equipped with the file transmission instruction unit 48. The file transmission instruction unit 48 is capable of issuing a file transmission instruction, which is an instruction to transmit files. In the case that the file transmission instruction is issued by the user on the instruction screen 133, the file transmission instruction unit 48 issues the instruction to transmit the files. Specifically, the file transmission instruction unit 48 writes a transmission instruction file 1303, which is an instruction file 130 in which the file transmission instruction is included, into the shared directory 104. More specifically, the file transmission instruction unit 48 writes the transmission instruction file 1303 into the transmission instruction folder 114 that is provided in the shared directory 104. FIG. 4E is a diagram showing an example of a transmission instruction file. In FIG. 4E, a state is shown conceptually in which the transmission instruction file 1303 is written into the transmission instruction folder 114.

Figure 5A:
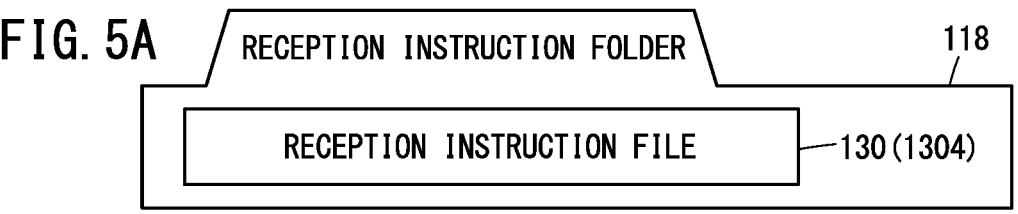
FIG. 5A is a diagram showing an example of a reception instruction file.

As noted previously, the instruction unit 40 may be equipped with the file reception instruction unit 50. The file reception instruction unit 50 is capable of issuing a file reception instruction, which is an instruction to receive files. The file reception instruction unit 50 writes, at predetermined time intervals, reception instruction files 1304 into the reception instruction folder 118 that is provided in the shared directory 104. More specifically, the file reception instruction unit 50 writes the reception instruction files 1304 into the reception instruction folder 118 at time intervals defined in a non-illustrated task scheduler. FIG. 5A is a diagram showing an example of a reception instruction file. In FIG. 5A, a state is shown conceptually in which the reception instruction file 1304 is written into the reception instruction folder 118.

Figure 5B:
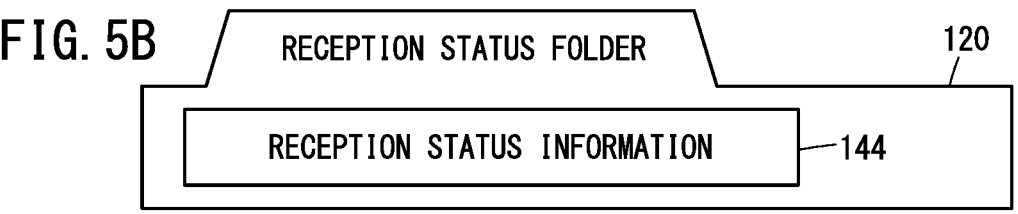
FIG. 5B is a diagram showing an example of reception status information.
Figure 5C:
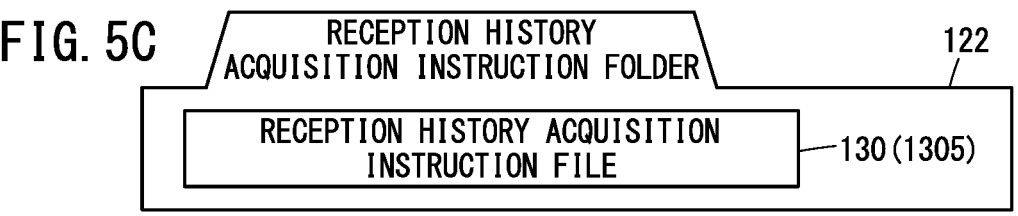
FIG. 5C is a diagram showing an example of a reception history acquisition instruction file.

As noted previously, the instruction unit 40 may be equipped with the reception history acquisition instruction unit 52. The reception history acquisition instruction unit 52 is capable of issuing an instruction concerning the acquisition of a reception history, which is a history of the reception of files. In the case that an instruction to receive the reception history is made by the user on the instruction screen 133, the reception history acquisition instruction unit 52 issues an instruction to acquire the reception history. Specifically, the reception history acquisition instruction unit 52 writes a reception history acquisition instruction file 1305, which is an instruction file 130 in which an instruction to acquire the reception history is included, into the shared directory 104. More specifically, the reception history acquisition instruction unit 52 writes the reception history acquisition instruction file 1305 into the reception history acquisition instruction folder 122 provided in the shared directory 104. FIG. 5C is a diagram showing an example of a reception history acquisition instruction file. In FIG. 5C, a state is shown conceptually in which the reception history acquisition instruction file 1305 is written into the reception history acquisition instruction folder 122.

As noted previously, the communication support device 16 may be equipped with the control unit 68. The control unit 68 administers the control of the communication support device 16 as a whole.

As noted previously, the communication support device 16 may be equipped with the processing unit 70. The processing unit 70 is capable of carrying out processing in accordance with the instruction files 130 that are written into the shared directory 104.

As noted previously, the processing unit 70 may be equipped with the file list creation processing unit 72. The file list creation processing unit 72 performs a process of creating the file list 132 on the basis of the file list acquisition instruction file 1301 that is written into the shared directory 104 by the file list acquisition instruction unit 44.

Specifically, the file list creation processing unit 72 performs a process of creating the file list 132 on the basis of the file list acquisition instruction file 1301 that is written into the file list acquisition instruction folder 106. More specifically, the file list creation processing unit 72 carries out the following process.

The file list creation processing unit 72 confirms at predetermined time intervals whether or not the file list acquisition instruction file 1301 is written into the file list acquisition instruction folder 106. More specifically, the file list creation processing unit 72 confirms at the predetermined time intervals defined in the non-illustrated task scheduler whether or not the file list acquisition instruction file 1301 is written into the file list acquisition instruction folder 106. In the case that the file list acquisition instruction file 1301 is written into the file list acquisition instruction folder 106, the file list creation processing unit 72 creates the file list 132 by confirming the files 131 that are stored in the storage unit 128. As noted previously, the file list 132 is a list of the plurality of files 131 that are stored in the storage unit 128.

The file list creation processing unit 72 writes the file list 132 created by the file list creation processing unit 72 into the shared directory 104. More specifically, the file list creation processing unit 72 writes the file list 132 created by the file list creation processing unit 72 into the file list folder 108 that is provided in the shared directory 104. FIG. 4B is a diagram showing an example of the file list. In FIG. 4B, a state is shown conceptually in which the file list 132 is written into the file list folder 108. The file list 132 that is written into the file list folder 108 is read out by the file list acquisition instruction unit 44.

As noted previously, the processing unit 70 may be equipped with the data conversion processing unit 74. The data conversion processing unit 74 performs a data conversion process on the basis of the data conversion instruction file 1302 that is written into the shared directory 104 by the data conversion instruction unit 46. Specifically, the data conversion processing unit 74 performs the data conversion process on the basis of the data conversion instruction file 1302 that is written into the data conversion instruction folder 110 that is provided in the shared directory 104. The data conversion process is carried out in order to convert the data into a format suitable for communication, although the present invention is not limited to this feature. A conversion in order to reduce the size of the data may be carried out with respect to the data. More specifically, the data conversion processing unit 74 carries out the following process.

The data conversion processing unit 74 confirms at predetermined time intervals whether or not the data conversion instruction file 1302 is written into the data conversion instruction folder 110. More specifically, the data conversion processing unit 74 confirms at the predetermined time intervals defined in the non-illustrated task scheduler whether or not the data conversion instruction file 1302 is written into the data conversion instruction folder 110. In the case that the data conversion instruction file 1302 is written into the data conversion instruction folder 110, the data conversion processing unit 74 carries out the following process. More specifically, in such a case, the data conversion processing unit 74 performs a data conversion process with respect to the conversion target file 151 (refer to FIG. 3) specified by the data conversion instruction included in the data conversion instruction file 1302. A data converted file obtained by performing the data conversion process with respect to the conversion target file 151 is stored in the storage unit 128.

The data conversion processing unit 74 writes into the shared directory 104 data conversion status information 136 indicating the status concerning the data conversion process performed with respect to the conversion target file 151. More specifically, the data conversion processing unit 74 writes into the data conversion status folder 112 that is provided in the shared directory 104 the data conversion status information 136 indicating the status concerning the data conversion process performed with respect to the conversion target file 151. FIG. 4D is a diagram showing an example of the data conversion process status information. In FIG. 4D, a state is shown conceptually in which the data conversion status information 136 is written into the data conversion status folder 112. The data conversion status information 136 that is written into the data conversion status folder 112 is read out by the data conversion instruction unit 46.

As noted previously, the processing unit 70 may be equipped with the file transmission processing unit 76. The file transmission processing unit 76 performs a file transmission process on the basis of the transmission instruction file 1303 that is written into the shared directory 104 by the file transmission instruction unit 48. Specifically, the file transmission processing unit 76 performs the file transmission process on the basis of the transmission instruction file 1303 that is written into the transmission instruction folder 114 that is provided in the shared directory 104. More specifically, the file transmission processing unit 76 carries out the following process.

Figure 6A:
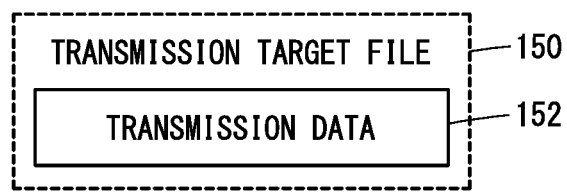
FIG. 6A is a diagram conceptually showing an example of a transmission target file.

The file transmission processing unit 76 confirms at predetermined time intervals whether or not the transmission instruction file 1303 is written into the transmission instruction folder 114. More specifically, the file transmission processing unit 76 confirms at the predetermined time intervals defined in the non-illustrated task scheduler whether or not the transmission instruction file 1303 is written into the transmission instruction folder 114. In the case that the transmission instruction file 1303 is written into the transmission instruction folder 114, the file transmission processing unit 76 reads out from the storage unit 128 a transmission target file 150 (refer to FIG. 6A) corresponding to the file transmission instruction included in the transmission instruction file 1303. FIG. 6A is a diagram conceptually showing an example of a transmission target file. As shown in FIG. 6A, transmission data 152, which is data serving as an object to be transmitted, is included in the transmission target file 150. As the transmission data 152, and more specifically, as the transmission target data, there may be cited the aforementioned product data, although the present invention is not limited to this feature.

Figure 6B:
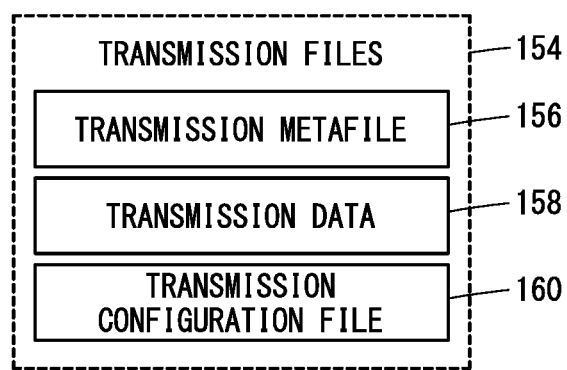
FIG. 6B is a diagram conceptually showing transmission files.

The file transmission processing unit 76 generates transmission files 154 (refer to FIG. 6B) corresponding to the transmission target file 150 that was read out by the file transmission processing unit 76. Specifically, the file transmission processing unit 76 generates a transmission metafile 156 and a transmission configuration file 160, based on comment information and the like contained in the file transmission instructions included in the transmission instruction file 1303. FIG. 6B is a diagram conceptually showing an example of the transmission files. As shown in FIG. 6B, the transmission files 154 can be constituted by the transmission metafile 156, transmission data 158, and the transmission configuration file 160. Transmission command parameters may be included in the transmission metafile 156. Destination information indicating a destination of the transmission files 154 may be included in the transmission metafile 156. Transmission source information indicating the transmission source of the transmission files 154 may be included in the transmission metafile 156. The transmission data 158 corresponds to the transmission data 152 included in the transmission target file 150. More specifically, the transmission data 158 can be generated, for example, by performing a data conversion process with respect to the transmission data 152 included in the transmission target file 150. The file transmission processing unit 76 generates the transmission data 158 by performing the data conversion process with respect to the transmission data 152. Moreover, in the case that the data conversion process has already been implemented beforehand with respect to the transmission data 152, the file transmission processing unit 76 includes in the transmission files 154 the transmission data 158 on which the data conversion process has already been implemented.

The file transmission processing unit 76 transmits the transmission files 154 (refer to FIG. 6B) generated by the file transmission processing unit 76 to the file exchange device 18 via the communication unit 66. More specifically, the file transmission processing unit 76 carries out transmission of the transmission data 158 on the basis of the transmission command parameters contained in the transmission metafile 156, and the information contained in the transmission configuration file 160. The transmission data 158 is transmitted to the file exchange device 18 by carrying out communications on the basis of the predetermined communication protocol between the communication unit 66 and the communication unit 86 that is provided in the file exchange device 18.

The file transmission processing unit 76 is capable of determining whether or not the transmission of the transmission files 154 to the destination has been completed based on the information supplied from the file exchange device 18. In the case it is determined that the transmission of the transmission files 154 to the destination has been completed, the file transmission processing unit 76 writes into the shared directory 104 transmission status information 140 indicating that the transmission of the transmission files 154 has been completed. More specifically, the file transmission processing unit 76 writes the transmission status information 140 indicating the status regarding the transmission of the transmission files 154 into the shared directory 104. More specifically, the file transmission processing unit 76 writes the transmission status information 140 indicating the status regarding the transmission of the transmission files 154 into the transmission status folder 116 that is provided in the shared directory 104. FIG. 4F is a diagram showing an example of the transmission status information. In FIG. 4F, a state is shown conceptually in which the transmission status information 140 is written into the transmission status folder 116. The transmission status information 140 that is written into the transmission status folder 116 is read out by the file transmission instruction unit 48.

Figure 7A:
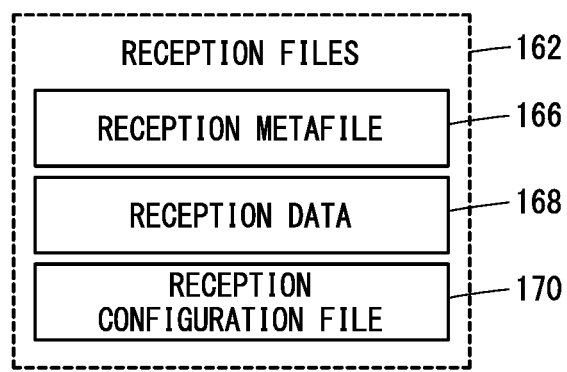
FIG. 7A is a diagram conceptually showing reception files.

As noted previously, the processing unit 70 may be equipped with the file reception processing unit 78. The file reception processing unit 78 confirms at predetermined time intervals whether or not the reception instruction file 1304 is written into the reception instruction folder 118. More specifically, the file reception processing unit 78 confirms at the predetermined time intervals defined in the non-illustrated task scheduler whether or not the reception instruction file 1304 is written into the reception instruction folder 118. In the case that the reception instruction file 1304 is written into the reception instruction folder 118, the file reception processing unit 78 acquires new arrival information supplied from the file exchange device 18 via the communication unit 66. The new arrival information is information indicating that reception files 162 (refer to FIG. 7A) that are destined for the apparatus 12 have been newly received by the file exchange device 18. On the basis of the new arrival information supplied from the file exchange device 18, the file reception processing unit 78 is capable of determining that the reception files 162 destined for the apparatus 12 have been newly received by the file exchange device 18. In the case it is determined that the reception files 162 destined for the apparatus 12 have been newly received by the file exchange device 18, the file reception processing unit 78 receives the reception files 162 from the file exchange device 18 via the communication unit 66. FIG. 7A is a diagram conceptually showing an example of the reception files. As shown in FIG. 7A, the reception files 162 can be constituted by a reception metafile 166, reception data 168, and a reception configuration file 170. Reception command parameters may be included in the reception metafile 166. Destination information indicating the destination of the reception files 162 may be included in the reception metafile 166. Transmission source information indicating the transmission source of the reception files 162 may be included in the reception metafile 166.

Figure 7B:
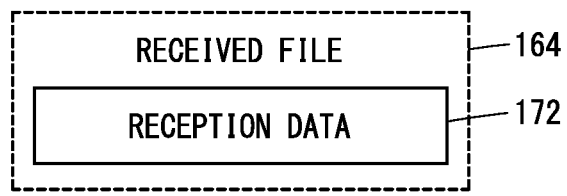
FIG. 7B is a diagram conceptually showing an example of a received file.

The file reception processing unit 78 stores a received file 164 (refer to FIG. 7B) corresponding to the reception files 162 that have been received, in the storage unit 128. Specifically, the file reception processing unit 78 generates the received file 164, for example, by carrying out a data conversion process with respect to the reception data 168 included in the reception files 162. The file reception processing unit 78 stores the received file 164 acquired by the file reception processing unit 78 in the storage unit 128. FIG. 7B is a diagram conceptually showing an example of a received file. As shown in FIG. 7B, the received file 164 includes reception data 172. The reception data 172, and in particular the received data, corresponds to the reception data 168 included in the reception files 162. More specifically, the reception data 172 is obtained by carrying out a data conversion process with respect to the reception data 168.

The file reception processing unit 78 writes reception status information 144 indicating the status regarding the reception of the reception files 162 into the shared directory 104. More specifically, the file reception processing unit 78 writes the reception status information 144 into the reception status folder 120 that is provided in the shared directory 104. FIG. 5B is a diagram showing an example of the reception status information. In FIG. 5B, a state is shown conceptually in which the reception status information 144 is written into the reception status folder 120. The reception status information 144 that is written into the reception status folder 120 is read out by the file reception instruction unit 50.

As noted previously, the processing unit 70 may be equipped with the reception history creation processing unit 80. The reception history creation processing unit 80 creates a reception history indicating a history of receptions of the files. Specifically, the reception history creation processing unit 80 performs updating of the reception history each time that reception of a file is carried out by the file reception processing unit 78. The reception history creation processing unit 80, for example, stores the reception history in the storage unit 64, although the present invention is not limited to this feature. Transmission source information indicating the transmission source of the reception files 162 may be included in the reception history. The transmission source information, as noted previously, is included in the reception metafile 166 that is included in the reception files 162.

Figure 5D:
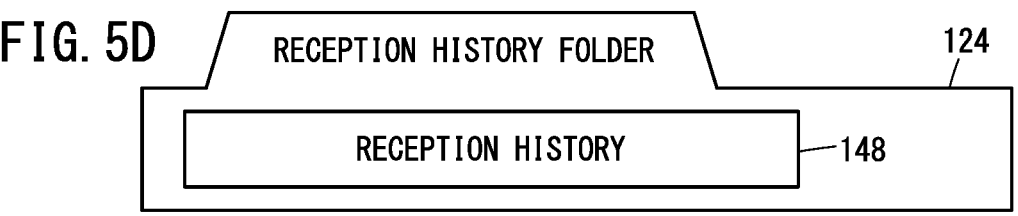
FIG. 5D is a diagram showing an example of a reception history.

The reception history creation processing unit 80 confirms at predetermined time intervals whether or not the reception history acquisition instruction file 1305 is written into the reception history acquisition instruction folder 122. More specifically, the reception history creation processing unit 80 confirms at the predetermined time intervals defined in the non-illustrated task scheduler whether or not the reception history acquisition instruction file 1305 is written into the reception history acquisition instruction folder 122. In the case that the reception history acquisition instruction file 1305 is written into the reception history acquisition instruction folder 122, the reception history creation processing unit 80 reads out, for example, from the storage unit 64, a reception history 148 created by the reception history creation processing unit 80. The reception history creation processing unit 80 writes the reception history 148 which was read out into the shared directory 104. More specifically, the reception history creation processing unit 80 writes the reception history 148 into the reception history folder 124 provided in the shared directory 104. FIG. 5D is a diagram showing an example of the reception history. In FIG. 5D, a state is shown conceptually in which the reception history 148 is written into the reception history folder 124. The reception history 148 which is written into the reception history folder 124 is read out by the reception history acquisition instruction unit 52.

Next, a description will be given concerning operations of the file exchange system according to the present embodiment. FIG. 8 is a flow chart illustrating an example of operations of the file exchange system according to the present embodiment. Operations in relation to transmission of the data are shown in FIG. 8.

In step S1, a non-illustrated login screen is displayed on the display unit 27 of the apparatus 12. Such a login screen is a screen in order for the apparatus 12 to login to the file exchange support device 14. In a state in which communication is established between the apparatus 12 and the file exchange support device 14, the login screen is displayed on the display unit 27 of the apparatus 12. The display of the login screen is realized by supplying the information in order to display the login screen to the apparatus 12 from the supply unit 42 that is provided in the file exchange support device 14. Thereafter, the process transitions to step S2.

In step S2, logging in is carried out by the user who operates the apparatus 12. Such logging in is performed on the login screen that is displayed on the display unit 27 of the apparatus 12. Thereafter, the process transitions to step S3.

In step S3, the file transmission/reception screen 134, which is the instruction screen 133 in order to transmit the files, is displayed on the display unit 27 of the apparatus 12. The display of the file transmission/reception screen 134 is realized by supplying the information in order to display the file transmission/reception screen 134 to the apparatus 12 from the supply unit 42 that is provided in the file exchange support device 14. The file list 132 can be displayed on the file transmission/reception screen 134. Thereafter, the process transitions to step S4.

In step S4, the transmission target file 150, which is a file that serves as an object to be transmitted, is selected from among the plurality of files 131 shown in the file list 132. Selection of the transmission target file 150 is carried out by the user on the file transmission/reception screen 134 that is displayed on the display unit 27 of the apparatus 12. Thereafter, the process transitions to step S5.

In step S5, a destination of the transmission target file 150 is selected. Selection of the destination of the transmission target file 150 is carried out by the user on the file transmission/reception screen 134 that is displayed on the display unit 27 of the apparatus 12. Selection of the destination of the transmission target file 150 can be carried out by the user who operates the apparatus 12. Moreover, although the present invention is not necessarily limited to this feature, the destination of the transmission target file 150 can be selected from among a plurality of destinations stored in the destination information storage unit 60 that is provided in the file exchange support device 14. Thereafter, the process transitions to step S6.

In step S6, an instruction to transmit the transmission target file 150 is issued by the user. The instruction to transmit the transmission target file 150 can be carried out on the file transmission/reception screen 134 that is displayed on the display unit 27 of the apparatus 12. Thereafter, the process transitions to step S7.

In step S7, the file transmission instruction unit 48 issues the file transmission instruction on the basis of an instruction from the user who operates the apparatus 12. Specifically, the file transmission instruction unit 48 writes the transmission instruction file 1303, which is an instruction file 130 in which the file transmission instruction is included, into the transmission instruction folder 114 that is provided in the shared directory 104. Thereafter, the process transitions to step S8.

In step S8, the file transmission processing unit 76 confirms whether or not the transmission instruction file 1303 has been written into the transmission instruction folder 114. In the case that the transmission instruction file 1303 has been written into the transmission instruction folder 114, the process transitions to step S9.

In step S9, the file transmission processing unit 76 reads out from the storage unit 128 the transmission target file 150 specified by the file transmission instruction included in the transmission instruction file 1303. Thereafter, the process transitions to step S10.

In step S10, the file transmission processing unit 76 generates the transmission metafile 156 and the transmission configuration file 160 on the basis of the file transmission instruction included in the transmission instruction file 1303. Thereafter, the process transitions to step S11.

In step S11, the file transmission processing unit 76 carries out transmission of the transmission files 154 on the basis of the transmission command parameters contained in the transmission metafile 156, and the information contained in the transmission configuration file 160. The file transmission processing unit 76 transmits the transmission files 154 to the file exchange device 18 via the communication unit 66 on the basis of the predetermined communication protocol. The destination of the transmission files 154, for example, is the apparatus 20. The control unit 88 that is provided in the file exchange device 18 transfers the transmission files 154 supplied from the communication support device 16 to the apparatus 20 via the communication unit 86 and the network 22. Moreover, it should be noted that the transmission files 154 supplied from the communication support device 16 may be temporarily stored in the storage unit 84 that is provided in the file exchange device 18. In this manner, the transmission files 154 are transmitted to the apparatus 20 that is the destination of the transmission files 154. In the case that the transmission of the transmission files 154 has been completed, the process transitions to step S12.

In step S12, the control unit 88 that is provided in the file exchange device 18 supplies information indicating that the transmission of the transmission files 154 to the apparatus 20 has been completed to the communication support device 16 via the communication unit 86. Consequently, the file transmission processing unit 76 acquires the information indicating that the transmission of the transmission files 154 has been completed. Thereafter, the process transitions to step S13.

In step S13, the file transmission processing unit 76 writes the transmission status information 140 indicating that the transmission of the transmission files 154 has been completed into the transmission status folder 116 that is provided in the shared directory 104. Thereafter, the process transitions to step S14.

In step S14, the file transmission instruction unit 48 reads out the transmission status information 140 that is written into the transmission status folder 116. Thereafter, the process transitions to step S15.

In step S15, the information indicating that the transmission of the transmission files 154 has been completed is stored in the storage unit 34. In this manner, the transmission of the files is carried out.

FIG. 9 is a flow chart illustrating an example of operations of the file exchange system according to the present embodiment. Operations in relation to reception of the data are shown in FIG. 9.

In step S21, the file reception instruction unit 50 that is provided in the file exchange support device 14 writes the reception instruction file 1304 containing the file reception instruction, which is an instruction to receive the files, into the reception instruction folder 118 that is provided in the shared directory 104. Thereafter, the process transitions to step S22.

In step S22, the file reception processing unit 78 that is provided in the communication support device 16 confirms whether or not the reception instruction file 1304 has been written into the reception instruction folder 118. In the case that the reception instruction file 1304 has been written into the reception instruction folder 118, the process transitions to step S23.

In step S23, the file reception processing unit 78 acquires the new arrival information supplied from the file exchange device 18 via the communication unit 66. On the basis of the new arrival information supplied from the file exchange device 18, the file reception processing unit 78 is capable of determining that the reception files 162 destined for the apparatus 12 have been newly received by the file exchange device 18. In the case that the file reception processing unit 78 has determined that the file exchange device 18 has newly received the reception files 162 destined for the apparatus 12, the process transitions to step S24.

In step S24, the file reception processing unit 78 receives the reception files 162 from the file exchange device 18 via the communication unit 66. Thereafter, the process transitions to step S25.

In step S25, the file reception processing unit 78 stores the received file 164 corresponding to the reception files 162 that have been received, in the storage unit 128. More specifically, the file reception processing unit 78 stores in the storage unit 128 the received file 164 by carrying out a data conversion process with respect to the reception data 168 included in the reception files 162.

In step S26, the file reception processing unit 78 writes the reception status information 144 indicating that the reception of the reception files 162 has been completed into the reception status folder 120 that is provided in the shared directory 104. Thereafter, the process transitions to step S27.

In step S27, the file reception instruction unit 50 reads out the reception status information 144 that is written into the reception status folder 120. Thereafter, the process transitions to step S28.

In step S28, the file reception instruction unit 50 stores the information indicating that the reception of the reception files 162 has been completed in the reception history storage unit 56 that is provided in the storage unit 34. In the forgoing manner, the reception of the files is carried out.

FIG. 10 is a flow chart illustrating an example of operations of the file exchange system according to the present embodiment. Operations in relation to conversion of the data are shown in FIG. 10.

In step S31, a non-illustrated login screen is displayed on the display unit 27 of the apparatus 12. Such a login screen is a screen in order for the apparatus 12 to login to the file exchange support device 14. In a state in which communication is established between the apparatus 12 and the file exchange support device 14, the login screen is displayed on the display unit 27 of the apparatus 12. Thereafter, the process transitions to step S32.

In step S32, logging in is carried out by the user who operates the apparatus 12. Such logging in is performed on the login screen that is displayed on the display unit 27 of the apparatus 12. Thereafter, the process transitions to step S33.

In step S33, for example, the file transmission/reception screen 134 is displayed on the display unit 27 of the apparatus 12. The file list 132 can be displayed on the file transmission/reception screen 134. Thereafter, the process transitions to step S34.

In step S34, the conversion target file 151, which is a file that serves as an object for data conversion, is selected from among the plurality of files 131. Selection of the conversion target file 151 is carried out by the user on the file transmission/reception screen 134 that is displayed on the display unit 27 of the apparatus 12. Thereafter, the process transitions to step S35.

In step S35, the user issues an instruction to execute the data conversion process. The instruction to execute the data conversion process can be carried out on the file transmission/reception screen 134 that is displayed on the display unit 27 of the apparatus 12. Thereafter, the process transitions to step S36.

In step S36, the data conversion instruction unit 46 issues an instruction to perform data conversion. Specifically, the data conversion instruction unit 46 writes the data conversion instruction file 1302, which is an instruction file 130 in which the data conversion instruction is included, into the data conversion instruction folder 110 that is provided in the shared directory 104. Thereafter, the process transitions to step S37.

In step S37, the data conversion processing unit 74 confirms whether or not the data conversion instruction file 1302 is written into the data conversion instruction folder 110. In the case that the data conversion instruction file 1302 is written into the data conversion instruction folder 110, the process transitions to step S38.

In step S38, the data conversion processing unit 74 performs the data conversion process with respect to the conversion target file 151 specified by the data conversion instruction included in the data conversion instruction file 1302. The data converted file obtained by performing the data conversion process with respect to the conversion target file 151 is stored in the storage unit 128. Thereafter, the process transitions to step S39.

In step S39, the data conversion processing unit 74 writes into the data conversion status folder 112 that is provided in the shared directory 104 the data conversion status information 136 indicating that the data conversion process has been completed. Thereafter, the process transitions to step S40.

In step S40, the data conversion instruction unit 46 reads out the data conversion status information 136 that is written into the data conversion status folder 112. Thereafter, the process transitions to step S41.

In step S41, the data conversion instruction unit 46 stores the information indicating that the data conversion process has been completed in the storage unit 34. In this manner, the data conversion process is carried out.

In the foregoing manner, according to the present embodiment, since the communication support device 16 that transmits the transmission files 154 to the file exchange device 18 is provided separately from the apparatus 12, it is not necessary for the apparatus 12 to perform communications with the file exchange device 18 over a prolonged time period. Therefore, according to the present embodiment, it is possible to provide the file exchange system 10 which can carry out the exchange of files in a satisfactory manner.

In addition, according to the present embodiment, since the transmission instruction file 1303 in which the file transmission instruction is included is transferred in the shared directory 104, it is not necessary to establish communications between the file exchange support device 14 and the communication support device 16 when the file transmission instruction is issued.

Further, according to the present embodiment, the file exchange support device 14 comprising the supply unit 42 that supplies the instruction screen 133 used when an instruction is issued by the user is provided separately from the file exchange device 18. Therefore, according to the present embodiment, when an instruction is issued by the user, it is not necessary for the file exchange device 18 to provide an instruction screen to the apparatus 12 that is operated by the user. For this reason, according to the present embodiment, it is possible to prevent the file exchange device 18 from being subjected to a large processing load. Therefore, according to the present embodiment, it is possible to provide the file exchange system 10 which can carry out the exchange of files in a satisfactory manner.

Moreover, it should be noted that the present invention is not limited to the embodiment described above, and various configurations can be adopted therein without departing from the essence and gist of the present invention.

The inventions that can be grasped from the above-described embodiment will be described below.

The file exchange system (10) according to one aspect of the present invention is a file exchange system configured to transmit and receive the files (131) in which the product data is included between the one user and the other user using the file exchange device (18). The file exchange system includes the communication support device (16) equipped with the communication unit (66) configured to communicate with the file exchange device on the basis of the predetermined communication protocol, wherein the communication support device further includes the processing unit (70) which is configured to carry out processing in accordance with the instruction file (130) that is written into the shared directory (104) based on the instruction from the one user, and the processing unit includes the file transmission processing unit (76) which, in the case that the instruction file (1303) containing the file transmission instruction has been written into the shared directory, is configured to read out the transmission target file (150) corresponding to the file transmission instruction from the storage unit (128), and to transmit the transmission file (154) corresponding to the read out transmission target file to the file exchange device via the communication unit. In accordance with such a configuration, since the communication support device that transmits the transmission files to the file exchange device is provided separately from the apparatus (12), it is not necessary for the apparatus (12) to perform communications with the file exchange device over a prolonged time period when transmitting the files. Therefore, in accordance with such a configuration, it is possible to provide the file exchange system which can carry out the exchange of files in a satisfactory manner. In addition, in accordance with such a configuration, since the transmission instruction file in which the file transmission instruction is included is transferred in the shared directory, it is not necessary to establish communications between the file exchange support device and the communication support device when the file transmission instruction is issued.

In the above-described file exchange system, the destination information indicating the destination of the transmission file may be included in the file transmission instruction.

In the above-describe file exchange system, the file transmission processing unit may write into the shared directory the transmission status information (140) indicating the status regarding the transmission of the transmission file.

In the above-described file exchange system, the product data may be at least one of Computer-Aided Design data, Computer-Aided Engineering data, moving image data, Tagged Image File Format data, Computer Graphics data, authentication data, or Electronic Control Unit data.

In the above-described file exchange system, the processing unit may include the file reception processing unit (78) which, in the case that the instruction file (1304) containing the file reception instruction has been written into the shared directory, is configured to receive the reception file (162) from the file exchange device via the communication unit, and to store the received file (164) corresponding to the received reception file in the storage unit. In accordance with such a configuration, since the communication support device that receives the reception files from the file exchange device is provided separately from the apparatus, it is not necessary for the apparatus to perform communications with the file exchange device over a prolonged time period when receiving the files.

In the above-described file exchange system, the file reception processing unit may write into the shared directory the reception status information (144) indicating the status regarding the reception of the reception file.

In the above-described file exchange system, the processing unit may include the data conversion processing unit (74) which, in the case that the instruction file (1302) containing the data conversion instruction has been written into the shared directory, is configured to carry out the data conversion process with respect to the conversion target file (151) specified by the data conversion instruction. In accordance with such a configuration, since the communication support device that performs the data conversion process is provided separately from the apparatus, it is not necessary for the apparatus to perform the data conversion process over a prolonged time period. Further, in accordance with such a configuration, since the data conversion process can be carried out in advance, compared with a case in which the data conversion process is performed after the instruction to transmit the data has been issued, the time from having issued the instruction to transmit the data until the transmission of the transmission files is completed can be made shorter.

In the above-described file exchange system, the data conversion processing unit may write into the shared directory the data conversion status information (136) indicating the status regarding the data conversion process with respect to the conversion target file.

In the above-described file exchange system, the file exchange support device (14) may be equipped with the supply unit (42) configured to supply the instruction screen (133) used when the instruction is carried out by the one user, wherein the file exchange support device may further include the instruction unit (40) configured to write the instruction file (130) into the shared directory (104) in accordance with the instruction carried out on the instruction screen, and the instruction unit may include the file transmission instruction unit (48) which, in the case that the instruction carried out on the instruction screen is the file transmission instruction, is configured to write the instruction file (1303) in which the file transmission instruction is included into the shared directory.

In the above-described file exchange system, the file transmission processing unit may write the transmission status information (140) indicating the status concerning the transmission of the transmission file into the shared directory, and the file transmission instruction unit may acquire the transmission status information that is written into the shared directory by the file transmission processing unit.

In the above-described file exchange system, the instruction unit may include the file reception instruction unit (50) configured to write the instruction file (1304) in which the file reception instruction is included into the shared directory, and the processing unit may include the file reception processing unit (78) which, in the case that the instruction file in which the file reception instruction is included has been written into the shared directory, is configured to receive the reception file (162) from the file exchange device via the communication unit, and to store the received file (164) corresponding to the received reception file in the storage unit.

In the above-described file exchange system, the file reception processing unit may write into the shared directory the reception status information (144) indicating the status concerning the reception of the reception file, and the file reception instruction unit may acquire the reception status information that is written into the shared directory by the file reception processing unit.

In the above-described file exchange system, the instruction unit may include the data conversion instruction unit (46) which, in the case that the instruction carried out on the instruction screen is the data conversion instruction, is configured to write into the shared directory the instruction file (1302) in which the data conversion instruction is included, and the processing unit may include the data conversion processing unit (74) which, in the case that the instruction file in which the data conversion instruction is included is written into the shared directory, is configured to perform the data conversion process with respect to the conversion target file (151) specified by the data conversion instruction.

In the above-described file exchange system, the data conversion processing unit may write into the shared directory the data conversion status information (136) indicating the status concerning the data conversion process with respect to the conversion target file, and the data conversion instruction unit may acquire the data conversion status information that is written into the shared directory by the data conversion processing unit.

The communication support device according to another aspect of the present invention is used in the file exchange system configured to transmit and receive files in which the product data is included between the one user and the other user using the file exchange device, the communication support device including the communication unit configured to communicate with the file exchange device on the basis of the predetermined communication protocol, and the processing unit which is configured to carry out processing in accordance with the instruction file that is written into the shared directory based on an instruction from the one user, and the processing unit includes the file transmission processing unit which, in the case that the instruction file containing the file transmission instruction is written into the shared directory, is configured to read out the transmission target file corresponding to the file transmission instruction from the storage unit, and to transmit the transmission file corresponding to the read out transmission target file to the file exchange device via the communication unit.

In the above-described communication support device, the processing unit may include the file reception processing unit which, in the case that the instruction file containing the file reception instruction has been written into the shared directory, is configured to receive the reception file from the file exchange device via the communication unit, and to store the received file corresponding to the received reception file in the storage unit.

In the above-described communication support device, the processing unit may include the data conversion processing unit which, in the case that the instruction file containing the data conversion instruction has been written into the shared directory, is configured to carry out the data conversion process with respect to the conversion target file specified by the data conversion instruction.

The file exchange support device according to yet another aspect of the present invention is a file exchange support device used in the file exchange system in which files in which the product data is included are transmitted and received between the one user and the other user using the file exchange device, the file exchange support device including the supply unit configured to supply the instruction screen used when the instruction is carried out by the one user, and the instruction unit configured to write the instruction file into the shared directory in accordance with the instruction carried out on the instruction screen, wherein the file exchange system includes the communication support device equipped with the communication unit configured to communicate with the file exchange device on the basis of the predetermined communication protocol, the communication support device further includes the processing unit configured to carry out processing in accordance with the instruction file that is written into the shared directory, the instruction unit includes the file transmission instruction unit which, in the case that the instruction carried out on the instruction screen is the file transmission instruction, is configured to write the instruction file in which the file transmission instruction is included into the shared directory, and the instruction unit includes the file transmission processing unit which, in the case that the instruction file in which the file transmission instruction is included has been written into the shared directory, is configured to read out the transmission target file corresponding to the file transmission instruction from the storage unit, and to transmit the transmission file corresponding to the read out transmission target file to the file exchange device via the communication unit.

In the above-described file exchange support device, the instruction unit may include the file reception instruction unit configured to write the instruction file in which a file reception instruction is included into the shared directory, and the processing unit may include the file reception processing unit which, in the case that the instruction file in which the file reception instruction is included has been written into the shared directory, is configured to receive the reception file from the file exchange device via the communication unit, and to store the received file corresponding to the received reception file in the storage unit.

In the above-described file exchange support device, the instruction unit may include the data conversion instruction unit which, in the case that the instruction carried out on the instruction screen is the data conversion instruction, is configured to write into the shared directory the instruction file in which the data conversion instruction is included, and the processing unit may include the data conversion processing unit which, in the case that the instruction file in which the data conversion instruction is included is written into the shared directory, is configured to perform the data conversion process with respect to the conversion target file specified by the data conversion instruction.

The file exchange method according to still another aspect of the present invention is a file exchange method for transmitting and receiving files in which the product data is included between the one user and the other user using the file exchange device. The file exchange method includes the step (S7) of writing the instruction file into the shared directory, and the step of carrying out processing in accordance with the instruction file, in the case that the instruction file has been written into the shared directory, wherein, in the case that the instruction file in which the file transmission instruction is included has been written into the shared directory, then in the step of carrying out processing in accordance with the instruction file, the transmission target file in accordance with the file transmission instruction is read out from the storage unit (S9), and the transmission file corresponding to the read out transmission target file is transmitted to the file exchange device via the communication unit configured to carry out communications with the file exchange device on the basis of the predetermined communication protocol (S11).

In the above-described file exchange method, in the case that the instruction file in which the file reception instruction is included is written into the shared directory, then in the step of carrying out processing in accordance with the instruction file, the reception file may be received from the file exchange device via the communication unit (step S24), and the received file corresponding to the received reception file may be stored in the storage unit (step S25).

In the above-described file exchange method, in the case that the instruction file in which the data conversion instruction is included has been written into the shared directory, then in the step of carrying out processing in accordance with the instruction file, the data conversion process is carried out with respect to the conversion target file specified by the data conversion instruction (S38).

In the above-described file exchange method, there may further be provided the step of supplying the instruction screen used when the instruction is carried out by the one user (S3), wherein in the step of writing the instruction file into the shared directory, the instruction file may be written into the shared directory in accordance with the instruction carried out on the instruction screen, and in the case that the instruction carried out on the instruction screen is the file transmission instruction, then in the step of writing the instruction file into the shared directory, the instruction file in which the file transmission instruction is included may be written into the shared directory.

In the above-described file exchange method, in the case that the instruction file in which the file reception instruction is included is written into the shared directory, then in the step of carrying out processing in accordance with the instruction file, the reception file may be received from the file exchange device via the communication unit (S24), and the received file corresponding to the received reception file may be stored in the storage unit (S25).

In the above-described file exchange method, in the case that the instruction carried out on the instruction screen is the data conversion instruction, then in the step of writing the instruction file into the shared directory, the instruction file in which the data conversion instruction is included may be written into the shared directory, and in the case that the instruction file in which the data conversion instruction is included is written into the shared directory, then in the step of carrying out the processing in accordance with the instruction file, the data conversion process may be carried out with respect to the conversion target file specified by the data conversion instruction (S38).

The computer-readable non-transitory storage medium according to yet another aspect of the present invention has the program stored therein, in order to cause the computer to execute the process including the step of confirming whether or not the instruction file has been written into the shared directory, and the step of carrying out processing in accordance with the instruction file, in the case that the instruction file has been written into the shared directory, wherein, in the case that the instruction file in which the file transmission instruction is included has been written into the shared directory, then in the step of carrying out processing in accordance with the instruction file, the transmission target file in accordance with the file transmission instruction is read out from the storage unit, and the transmission file corresponding to the read out transmission target file is transmitted to the file exchange device via the communication unit that carries out communications with the file exchange device on the basis of the predetermined communication protocol.

In the above-described storage medium, in the case that the instruction file in which the file reception instruction is included is written into the shared directory, then in the step of carrying out processing in accordance with the instruction file, the reception file may be received from the file exchange device via the communication unit, and the received file corresponding to the received reception file may be stored in the storage unit.

In the above-described storage medium, in the case that the instruction file in which the data conversion instruction is included has been written into the shared directory, then in the step of carrying out processing in accordance with the instruction file, the data conversion process may be carried out with respect to the conversion target file specified by the data conversion instruction.

In the above-described storage medium, the program causes the computer to further execute the process including the step of supplying the instruction screen used when the instruction is carried out by the one user, and in the step of writing the instruction file into the shared directory, the instruction file may be written into the shared directory in accordance with the instruction carried out on the instruction screen, in the case that the instruction carried out on the instruction screen is the file transmission instruction, then in the step of writing the instruction file into the shared directory, the instruction file in which the file transmission instruction is included may be written into the shared directory, and in the case that the instruction file in which the file transmission instruction is included is written into the shared directory, the file transmission processing unit provided in the communication support device may read out from the storage unit the transmission target file in accordance with the file transmission instruction, and the transmission file corresponding to the read out transmission target file may be transmitted to the file exchange device via the communication unit that carries out communications with the file exchange device on the basis of the predetermined communication protocol.

In the above-described storage medium, in the case that the instruction file in which the file reception instruction is included is written into the shared directory, the file reception processing unit provided in the communication support device may receive the reception file from the file exchange device via the communication unit, and may store the received file corresponding to the received reception file in the storage unit.

In the above-described storage medium, in the case that the instruction carried out on the instruction screen is the data conversion instruction, then in the step of writing the instruction file into the shared directory, the instruction file in which the data conversion instruction is included may be written into the shared directory, and in the case that the instruction file in which the data conversion instruction is included is written into the shared directory, the data conversion processing unit provided in the communication support device may carry out the data conversion process with respect to the conversion target file specified by the data conversion instruction.

The present invention is not limited to the above disclosure, and various modifications are possible without departing from the essence and gist of the present invention.

What is claimed is:

1. A file exchange system configured to transmit and receive files in which product data is included between one user and another user using a file exchange device, the file exchange system comprising:
    a communication support device configured to communicate with the file exchange device on a basis of a predetermined communication protocol;
    wherein the communication support device comprises one or more processors that execute computer-executable instructions stored in a memory,
    the one or more processors execute the computer-executable instructions to cause the communication support device to:
    carry out processing in accordance with an instruction file that is written into a shared directory based on an instruction from the one user; and
    read out, in a case that the instruction file containing a file transmission instruction has been written into the shared directory, a transmission target file corresponding to the file transmission instruction, and transmit a transmission file corresponding to the read out transmission target file to the file exchange device.

2. The file exchange system according to claim 1, wherein destination information indicating a destination of the transmission file is included in the file transmission instruction.

3. The file exchange system according to claim 1, wherein the one or more processors cause the communication support device to write into the shared directory, transmission status information indicating a status regarding transmission of the transmission file.

4. The file exchange system according to claim 1, wherein the product data is at least one of Computer-Aided Design data, Computer-Aided Engineering data, moving image data, Tagged Image File Format data, Computer Graphics data, authentication data, or Electronic Control Unit data.

5. The file exchange system according to claim 1, wherein the one or more processors cause the communication support device to receive, in a case that the instruction file containing a file reception instruction has been written into the shared directory, a reception file from the file exchange device, and to store a received file corresponding to the received reception file.

6. The file exchange system according to claim 5, wherein the one or more processors cause the communication support device to write into the shared directory, reception status information indicating a status regarding reception of the reception file.

7. The file exchange system according to claim 1, wherein the one or more processors cause the communication support device to carry out, in a case that the instruction file containing a data conversion instruction has been written into the shared directory, a data conversion process with respect to a conversion target file specified by the data conversion instruction.

8. The file exchange system according to claim 7, wherein the one or more processors cause the communication support device to write into the shared directory, data conversion status information indicating a status regarding the data conversion process with respect to the conversion target file.

9. The file exchange system according to claim 1, further comprising a file exchange support device equipped with one or more processors that execute computer-executable instructions stored in a memory,
    the one or more processors of the file exchange support device execute the computer-executable instructions to cause the file exchange support device to:
    supply an instruction screen used when the instruction is carried out by the one user;
    write the instruction file into the shared directory in accordance with the instruction carried out on the instruction screen; and
    write into the shared directory, in a case that the instruction carried out on the instruction screen is the file transmission instruction, the instruction file in which the file transmission instruction is included.

10. The file exchange system according to claim 9, wherein:
    the one or more processors of the file exchange support device cause the file exchange support device to write transmission status information indicating a status concerning transmission of the transmission file into the shared directory; and
    acquire the transmission status information that is written into the shared directory.

11. The file exchange system according to claim 9, wherein:
    the one or more processors of the file exchange support device cause the file exchange support device to write the instruction file in which a file reception instruction is included into the shared directory; and
    the one or more processors of the communication support device cause the communication support device to receive, in a case that the instruction file in which the file reception instruction is included has been written into the shared directory, a reception file from the file exchange device, and to store a received file corresponding to the received reception file.

12. The file exchange system according to claim 11, wherein:
    the one or more processors of the communication support device cause the communication support device to write into the shared directory, reception status information indicating a status concerning reception of the reception file; and the one or more processors of the file exchange support device cause the file exchange support device to acquire the reception status information that is written into the shared directory.

13. The file exchange system according to claim 9, wherein:
the one or more processors of the file exchange support device cause the file exchange support device to write into the shared directory, in a case that the instruction carried out on the instruction screen is a data conversion instruction, the instruction file in which the data conversion instruction is included; and
the one or more processors of the communication support device cause the communication support device to perform, in a case that the instruction file in which the data conversion instruction is included is written into the shared directory, a data conversion process with respect to a conversion target file specified by the data conversion instruction.

14. The file exchange system according to claim 13, wherein:
the one or more processors of the communication support device cause the communication support device to write into the shared directory, data conversion status information indicating a status concerning the data conversion process with respect to the conversion target file; and
the one or more processors of the file exchange support device cause the file exchange support device to acquire the data conversion status information that is written into the shared directory.

15. A communication support device used in a file exchange system configured to transmit and receive files in which product data is included between one user and another user using a file exchange device, the communication support device comprising one or more processors that execute computer-executable instructions stored in a memory,
wherein the one or more processors execute the computer-executable instructions to cause the communication support device to:
communicate with the file exchange device on a basis of a predetermined communication protocol;
carry out processing in accordance with an instruction file that is written into a shared directory based on an instruction from the one user; and
read out, in a case that the instruction file containing a file transmission instruction is written into the shared directory, a transmission target file corresponding to the file transmission instruction, and transmit a transmission file corresponding to the read out transmission target file to the file exchange device.

16. The communication support device according to claim 15, wherein the one or more processors cause the communication support device to receive, in a case that the instruction file containing a file reception instruction has been written into the shared directory, a reception file from the file exchange device, and to store a received file corresponding to the received reception file.

17. The communication support device according to claim 15, wherein the one or more processors cause the communication support device to carry out, in a case that the instruction file containing a data conversion instruction has been written into the shared directory, a data conversion process with respect to a conversion target file specified by the data conversion instruction.

18. A file exchange support device used in a file exchange system in which files in which product data is included are transmitted and received between one user and another user using a file exchange device, the file exchange support device comprising one or more processors that execute computer-executable instructions stored in a memory,
wherein the one or more processors execute the computer-executable instructions to cause the file exchange support device to:
supply an instruction screen used when an instruction is carried out by the one user; and
write an instruction file into a shared directory in accordance with the instruction carried out on the instruction screen, and
wherein:
the file exchange system comprises a communication support device configured to communicate with the file exchange device on a basis of a predetermined communication protocol;
the communication support device comprises one or more processors that execute computer-executable instructions stored in a memory,
the one or more processors of the communication support device execute the computer-executable instructions to cause the communication support device to carry out processing in accordance with the instruction file that is written into the shared directory;
the one or more processors of the file exchange support device cause the file exchange support device to write into the shared directory, in a case that the instruction carried out on the instruction screen is a file transmission instruction, the instruction file in which the file transmission instruction is included; and
the one or more processors of the communication support device cause the communication support device to read out, in a case that the instruction file in which the file transmission instruction is included has been written into the shared directory, a transmission target file corresponding to the file transmission instruction, and to transmit a transmission file corresponding to the read out transmission target file to the file exchange device.

19. The file exchange support device according to claim 18, wherein:
the one or more processors of the file exchange support device cause the file exchange support device to write the instruction file in which a file reception instruction is included into the shared directory; and
the one or more processors of the communication support device cause the communication support device to receive, in a case that the instruction file in which the file reception instruction is included has been written into the shared directory, a reception file from the file exchange device, and to store a received file corresponding to the received reception file.

20. The file exchange support device according to claim 18, wherein:
the one or more processors of the file exchange support device cause the file exchange support device to write into the shared directory, in a case that the instruction carried out on the instruction screen is a data conversion instruction, the instruction file in which the data conversion instruction is included; and
the one or more processors of the communication support device cause the communication support device to perform, in a case that the instruction file in which the data conversion instruction is included is written into the shared directory, a data conversion process with respect to a conversion target file specified by the data conversion instruction.

21. A file exchange method for transmitting and receiving files in which product data is included between one user and another user using a file exchange device, the file exchange method comprising:
  writing an instruction file into a shared directory; and
  carrying out processing in accordance with the instruction file, in a case that the instruction file has been written into the shared directory,
  wherein in a case that the instruction file in which a file transmission instruction is included has been written into the shared directory, then in the processing in accordance with the instruction file, a transmission target file in accordance with the file transmission instruction is read out, and a transmission file corresponding to the read out transmission target file is transmitted to the file exchange device on a basis of a predetermined communication protocol.

22. The file exchange method according to claim 21, wherein, in a case that the instruction file in which the file reception instruction is included is written into the shared directory, then in the processing in accordance with the instruction file, a reception file is received from the file exchange device, and a received file corresponding to the received reception file is stored.

23. The file exchange method according to claim 21, wherein, in a case that the instruction file in which a data conversion instruction is included has been written into the shared directory, then in the processing in accordance with the instruction file, a data conversion process is carried out with respect to a conversion target file specified by the data conversion instruction.

24. The file exchange method according to claim 21, further comprising:
  supplying an instruction screen used when an instruction is carried out by the one user,
  wherein:
  in the writing of the instruction file into the shared directory, the instruction file is written into the shared directory in accordance with the instruction carried out on the instruction screen; and
  in a case that the instruction carried out on the instruction screen is the file transmission instruction, then in the writing of the instruction file into the shared directory, the instruction file in which the file transmission instruction is included is written into the shared directory.

25. The file exchange method according to claim 24, wherein, in a case that the instruction file in which a file reception instruction is included is written into the shared directory, then in the processing in accordance with the instruction file, a reception file is received from the file exchange device, and a received file corresponding to the received reception file is stored.

26. The file exchange method according to claim 24, wherein:
  in a case that the instruction carried out on the instruction screen is a data conversion instruction, then in the writing of the instruction file into the shared directory, the instruction file in which the data conversion instruction is included is written into the shared directory; and
  in a case that the instruction file in which the data conversion instruction is included is written into the shared directory, then in the processing in accordance with the instruction file, a data conversion process is carried out with respect to a conversion target file specified by the data conversion instruction.

27. A computer-readable non-transitory storage medium having a program stored therein in order to cause a computer to execute a process comprising:
  confirming whether or not an instruction file has been written into a shared directory; and
  carrying out processing in accordance with the instruction file, in a case that the instruction file has been written into the shared directory,
  wherein, in a case that the instruction file in which a file transmission instruction is included has been written into the shared directory, then in the processing in accordance with the instruction file, a transmission target file in accordance with the file transmission instruction is read out, and a transmission file corresponding to the read out transmission target file is transmitted to a file exchange device on a basis of a predetermined communication protocol.

28. The storage medium according to claim 27, wherein, in a case that the instruction file in which a file reception instruction is included is written into the shared directory, then in the processing in accordance with the instruction file, a reception file is received from the file exchange device, and a received file corresponding to the received reception file is stored.

29. The storage medium according to claim 27, wherein, in a case that the instruction file in which a data conversion instruction is included has been written into the shared directory, then in the processing in accordance with the instruction file, a data conversion process is carried out with respect to a conversion target file specified by the data conversion instruction.

30. The storage medium according to claim 27, wherein the program causes the computer to further execute a process comprising supplying an instruction screen used when the instruction is carried out by the one user;
  in the writing of the instruction file into the shared directory, the instruction file is written into the shared directory in accordance with the instruction carried out on the instruction screen;
  in a case that the instruction carried out on the instruction screen is the file transmission instruction, then in the writing of the instruction file into the shared directory, the instruction file in which the file transmission instruction is included is written into the shared directory; and
  in a case that the instruction file in which the file transmission instruction is included is written into the shared directory, one or more processors provided in a communication support device read out the transmission target file in accordance with the file transmission instruction, and the transmission file corresponding to the read out transmission target file is transmitted to the file exchange device on a basis of a predetermined communication protocol.

31. The storage medium according to claim 30, wherein, in a case that the instruction file in which a file reception instruction is included is written into the shared directory, the one or more processors provided in the communication support device receive a reception file from the file exchange device, and stores a received file corresponding to the received reception file.

32. The storage medium according to claim 30, wherein:
  in a case that the instruction carried out on the instruction screen is a data conversion instruction, then in the writing of the instruction file into the shared directory, the instruction file in which the data conversion instruction is included is written into the shared directory; and in a case that the instruction file in which the data conversion instruction is included is written into the shared directory, the one or more processors provided in the communication support device carries out a data conversion process with respect to a conversion target file specified by the data conversion instruction.

* * * * *